United States Patent [19]
Fujioka

[11] Patent Number: 5,727,230
[45] Date of Patent: Mar. 10, 1998

[54] APPARATUS FOR ELECTROMAGNETIC COMMUNICATION BETWEEN A COMPUTER AND A NON-CONTACT IC CARD

[75] Inventor: Shuzo Fujioka, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 426,850

[22] Filed: Apr. 24, 1995

[30] Foreign Application Priority Data

Apr. 28, 1994 [JP] Japan ................... 6-092702

[51] Int. Cl.⁶ ................... G06F 13/00; G06F 13/20
[52] U.S. Cl. ................... 395/825; 395/827; 395/840
[58] Field of Search ................... 395/825, 827, 395/840

[56] References Cited

U.S. PATENT DOCUMENTS

| | | | |
|---|---|---|---|
| 4,727,244 | 2/1988 | Nakano et al. | 235/380 |
| 4,798,322 | 1/1989 | Bernstein et al. | 235/487 |
| 4,924,171 | 5/1990 | Baba et al. | 323/347 |
| 4,960,983 | 10/1990 | Inoue | 235/449 |
| 5,012,489 | 4/1991 | Burton et al. | 375/8 |
| 5,019,970 | 5/1991 | Yamaguchi et al. | 395/442 |
| 5,113,184 | 5/1992 | Katayama | 340/825.54 |
| 5,157,247 | 10/1992 | Takahira | 235/492 |
| 5,220,158 | 6/1993 | Takahira et al. | 235/492 |
| 5,282,247 | 1/1994 | McLean et al. | 380/4 |
| 5,296,692 | 3/1994 | Shino | 235/486 |
| 5,326,965 | 7/1994 | Inoue | 235/492 |
| 5,337,063 | 8/1994 | Takahira | 343/741 |
| 5,353,434 | 10/1994 | Katayama | 395/551 |
| 5,362,954 | 11/1994 | Komatsu | 235/492 |
| 5,396,056 | 3/1995 | Yamaguchi | 235/492 |
| 5,418,353 | 5/1995 | Katayama et al. | 235/380 |
| 5,432,328 | 7/1995 | Yamaguchi | 235/449 |
| 5,444,222 | 8/1995 | Inoue | 235/380 |

FOREIGN PATENT DOCUMENTS

| | | |
|---|---|---|
| 0341665 | 11/1989 | European Pat. Off. . |
| 0494710 | 7/1992 | European Pat. Off. . |
| 63-268085 | 11/1988 | Japan . |
| WO9209054 | 5/1992 | WIPO . |

*Primary Examiner*—Thomas C. Lee
*Assistant Examiner*—Rehana Perveen
*Attorney, Agent, or Firm*—Leydig, Voit & Mayer, Ltd.

[57] ABSTRACT

A reader/writer includes an input/output unit for inputting and outputting bidirectional signals from and to an external host computer, a transmitter/receiver for transmitting to and receiving from a noncontact IC card bidirectional electromagnetic-wave signals, the controller being electrically connected to the input/output unit and transmitter/receiver for transferring signals between them. The reader/writer thus assists in transferring signals between an external host computer and a noncontact IC card. The operation of the reader/writer is so simple that communication between a noncontact IC card and an external host computer can be achieved efficiently. The software implemented in the reader/writer need not be modified but can still cope with various application programs running in the noncontact IC card and external host computer.

11 Claims, 19 Drawing Sheets

FIG. 16
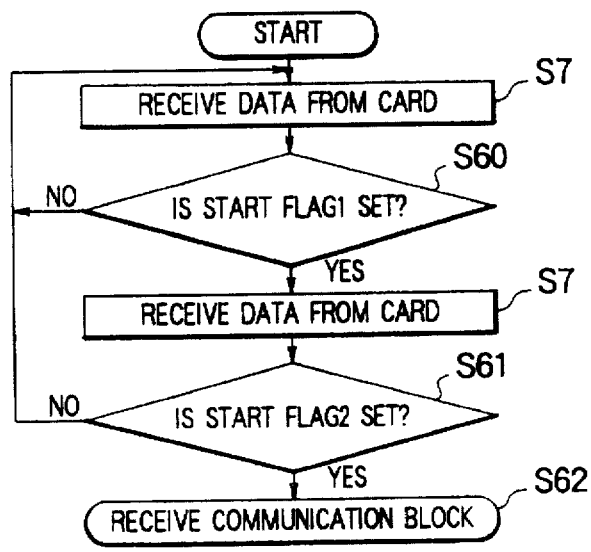
FIG. 17
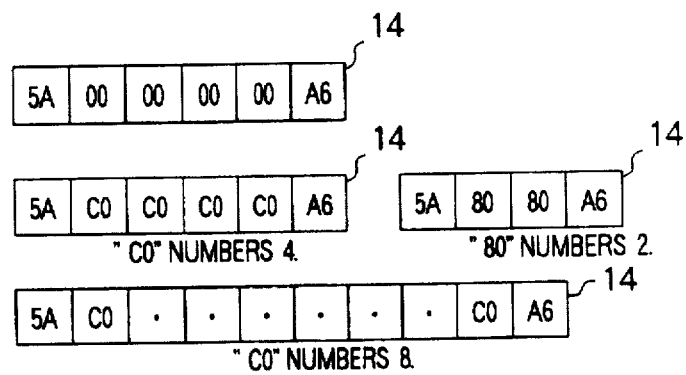
FIG. 18
| | CARD NUMBER | | | | | | | |
|---|---|---|---|---|---|---|---|---|
| | 0 | 1 | 2 | 3 | 4 | 5 | 6 | 7 |
| 14A — | CHECK SUM | ミ | ツ | ビ | シ | NAME | タ | ロ |
| | ウ | CHECK SUM | 9 | 3 | 1 | 0 | 2 | 4 |
| 14A — | CHECK SUM | 14A | | | | | | |

APPARATUS FOR ELECTROMAGNETIC COMMUNICATION BETWEEN A COMPUTER AND A NON-CONTACT IC CARD

BACKGROUND OF THE INVENTION

1. Field of the Invention

The present invention relates to a reader/writer for communicating with a noncontact IC card and to a noncontact IC card system based on the reader/writer.

2. Description of the Related Art

FIG. 21 shows a known noncontact IC card system. As illustrated, a host computer 1 such as a personal computer is electrically linked to a noncontact IC card reader/writer 2 by way of a communication line 3 conformable to the RS-232C standard or the like, and communicates with the noncontact card reader/writer 2. The reader/writer 2 transfers data to or from a noncontact IC card 4 in a noncontact fashion by means of electromagnetic waves 5. FIG. 22 shows a protocol for defining communication among the host computer 1, reader/writer 2, and noncontact IC card 4. First, the host computer 1 instructs the reader/writer 2 to start operating. The reader/writer 2 then produces a command to be transferred to the noncontact IC card 4 and carries out other jobs. The reader/writer 2 then sends the command to the noncontact IC card 4. The noncontact IC card 4 executes the command sent from the reader/writer 2, and returns the result of the execution to the reader/writer 2. The reader/writer 2 processes the result of execution sent from the noncontact IC card 4 and returns required information as a result of processing to the host computer 1.

In this case, after the reader/writer 2 starts operating, if the noncontact IC card 4 sends no access request, the reader/writer 2 repetitively produces a command and transmits it to the noncontact IC card 4 until it receives an access request from the noncontact IC card 4. FIG. 27 shows a protocol for defining communication made in this case. The noncontact IC card 4 is moved in a direction of arrow 9 in FIG. 28 so that it will gradually enter an access area 8, in which communication with the reader/writer 2 is enabled, indicated by a phantom line. The commands ① in FIG. 27 are carried out when the noncontact IC card 4 lies outside the access area 8 as indicated with ① in FIG. 28. The communication ② in FIG. 27 is carried out when the noncontact IC card 4 lies in the access area 8 as indicated with ② in FIG. 28.

FIG. 26 is a block diagram showing the reader/writer 2 and noncontact IC card 4. As illustrated, the reader/writer 2 and noncontact IC card 4 have transmitting/receiving antennas 2a and 4a respectively. The transmitting/receiving antennas 2a and 4a transmit or receive electromagnetic waves 5 and convert the electromagnetic waves 5 into signal waves or vice versa. The transmitting/receiving antennas 2a and 4a are electrically connected to transmitter/receivers 2b and 4b respectively. The transmitter/receivers 2b and 4b include universal asynchronous receiver/transmitters (hereinafter, UARTs) or the like, and modulate or demodulate signal waves and convert serial data into parallel data or vice versa. The transmitter/receivers 2b and 4b are electrically connected to control units 2c and 4c respectively. The control unit 2c in the reader/writer 2 is electrically connected to an input/output unit 2d enabling bidirectional communication with the host computer 1 (See FIG. 21) by way of the communication line 3. The control unit 2c in the reader/writer 2 transfers signals or data to or from the transmitter/receiver 2b or input/output unit 2d. The control unit 4c in the noncontact IC card 4 transfers signals or data to or from the transmitter/receiver 4b. The control units 2c and 4c control the whole reader/writer and noncontact IC card respectively. The reader/writer 2 has a power supply 2e, while the noncontact IC card 4 has a battery 4d.

FIG. 25 shows a modulation form adopted in the transmitter/receivers 2b and 4b. A and B in FIG. 25 denote waveforms of signals at points A and B in FIG. 26. As shown in FIG. 25, the transmitter/receivers 2b and 4b adopt an amplitude shift keying (hereinafter, ASK) technique in which the presence of a signal sent from each of the transmitting/receiving antennas 2a and 4a is represented by a "0" and the absence thereof is represented by a "1".

FIGS. 23 and 24 show a communication block transferred between the reader/writer 2 and noncontact IC card 4 and a data structure of transmission data 10 in the communication block. FIG. 24 shows a format employed in transferring transmission data 10 one byte long according to serial I/O. As shown in FIG. 23, the transmission data 10 that is one byte long and produced in conformity with the format shown in FIG. 24 are handled as a communication block in units of several bytes to several tens of bytes. To begin with, the data structure of the transmission data 10 one byte long will be described in conjunction with FIG. 24. First, a one-bit start bit 10a is succeeded by eight bits of data 10b starting with a least significant bit (hereinafter LSB) and ending with a most significant bit (hereinafter MSB). The data 10b is followed by a (even) parity bit 10c and a stop bit 10d consisting of two bits each representing a high-level state. Next, the communication block shown in FIG. 23 will be described. The communication block has a start flag 12 which is a leading code of a communication block. Until the start flag 12 is received, all codes received are ignored. The start flag 12 is for example defined as a value FFH or 00H as shown in FIG. 31. The start flag 12 is succeeded by, as mentioned above, several or several tens of bytes of the data 10 including data and a result of execution. The data 10 is followed by a checksum 14. The checksum 14 is an error-detecting code appended to the end of a communication block. The checksum 14 is calculated as follows. First, a value that is an arithmetic sum of all the bytes from the start flag 12 to the checksum 14, exclusive of the checksum 14, is obtained. When the value exceeds 8 bits, high-order bits are rounded down and eight low-order bits alone are used. A 2's complement of the value is calculated in order to gain the checksum 14.

FIG. 30 is a flowchart describing a sequence of receiving a communication block. As illustrated, the reader/writer 2 receives some data (step S50), and then checks if the start flag 12 is present (See FIG. 23) to see if the data is sent from the noncontact IC card 4 (step S51). When it is confirmed that the start flag 12 is present, the reader/writer 2 starts receiving the transmission data 10 (See FIG. 23) succeeding the start flag 12 (step S52).

In the known noncontact IC card system having the aforesaid configuration, the reader/writer 2 processes various jobs; that is, produces a command or the like to be transmitted for the noncontact IC card 4, analyzes a result of execution sent from the noncontact IC card 4, and transmits only required information to the host computer 1. Every time an application program or a baud rate set in the reader/writer 2 or host computer 1 is altered, software implemented in the reader/writer 2 must be modified.

In the known noncontact IC card system, as mentioned above and shown in FIG. 27, every time a command is sent from the host computer 1, the reader/writer 2 must repeatedly process jobs including production of a command to be sent for the noncontact IC card 4, and then transmits data to the noncontact IC card 4. Thus, the reader/writer 2 must incur a heavy load.

Furthermore, as mentioned above, when receiving data through electromagnetic waves, the reader/writer 2 checks if the start flag 12 to be appended to the start of a communication block to be sent from the noncontact IC card 4 is present, and then starts receiving the communication block. The reader/writer 2 ignores data until it finds the start flag 12. As mentioned above, the start flag 12 is defined as the value FFH or 00H represented by such simple signal waves as those shown in FIG. 31. Therefore, when the reader/writer 2 receives noise, since noise usually occurs at regular intervals, the noise may be mistaken for the start flag 12. In this case, even if a correct communication block is received after noise is, since the noise is mistaken for the start flag 12, a start point for reading data is shifted by the length of the start flag. The data cannot therefore be received correctly.

In the known noncontact IC card system, the 00H code is written in a free area in a memory in a noncontact IC card. As for communication data, the high-order bits are prone to misrepresentation. For example, 00H is often misrepresented as 80H or C0H. Incidentally, since a checksum represents a sum of eight low-order bits alone, when a multiple of 2 of 80H and a multiple of 2 of C0H are sent, the checksum represents the same value as that when a multiple of 2 or 4 of 00H are sent. It is therefore difficult to detect an error.

In the known noncontact IC card system, as shown in FIG. 29, when the carrier frequency or baud rate of the noncontact IC card 4 is to be changed, the noncontact IC card 4 executes a Change command upon receipt of it from the reader/writer 2 and returns a result of execution at a changed baud rate. Until the result of execution is returned from the noncontact IC card 4 to the reader/writer 2, the baud rate of the reader/writer 2 must be in conformity with the one of the noncontact IC card 4. It is difficult to determine the timing of changing the baud rate of the reader/writer 2. The baud rate of the reader/writer 2 cannot sometimes be changed in time for receiving the result of the execution sent from the noncontact IC card.

For re-formatting the noncontact IC card 4, a baud rate agreed between the reader/writer 2 and noncontact IC card 4 may be different from the one adopted in the system within which the noncontact IC card 4 has operated before. In this case, the noncontact IC card 4 cannot be re-formatted within the known noncontact IC card system. For example, after a noncontact IC card set to a baud rate of 9600 bps is formatted at a baud rate of 19200 bps, the noncontact IC card copes with the baud rate of 19200 bps. The formatted noncontact IC card coping with the baud rate of 19200 bps cannot be re-formatted within a system permitting formatting at the baud rate of 9600 bps alone. Every time this event occurs, an operator has had to operate the host computer 1 to send to the reader/writer 2 a command instructing that the baud rate be changed. After the baud rate of the reader/writer 2 is changed, an attempt is made to re-format the noncontact IC card.

SUMMARY OF THE INVENTION

The present invention attempts to solve the foregoing problems. An object of the present invention is to lighten the load imposed on a reader/writer, to provide a reader/writer that can cope with a change of the application program or baud rate set in a noncontact IC card or a host computer, and prevent occurrence of various communication errors due to incorrect timing of changing a baud rate or presence of noise, that allows an operator to enjoy easy re-formatting of a noncontact IC card, that offers improved communication efficiency and reliability, and that enables fast communications, and to provide a noncontact IC card system based on the reader/writer.

According to the first aspect of the present invention, there is provided a reader/writer assisting in communication between an external host computer and a noncontact IC card. The reader/writer comprises an input/output means electrically linked to the external host computer and designed to input or output bidirectional signals from or to the external host computer, a control means electrically connected to the input/output means for controlling a transmission of signals between the external host computer and noncontact IC card, an electromagnetic wave transmitter/receiver means electrically connected to the control means and designed to transmit or receive bidirectional electromagnetic-wave signals to or from the noncontact IC card. The control means determines whether a signal has been received from the external host computer via the input/output means. If a signal has been received, it is determined whether the signal is a command or data. If the signal is a command, the command is executed. If the signal is data, the data is transmitted to the noncontact IC card via the electromagnetic wave transmitter/receiver means. If no signal has been received, it is determined whether a signal has been received from the noncontact IC card via the electromagnetic wave transmitter/receiver means. If a signal has been received, the signal is transmitted to the external host computer via the input/output means.

According to the second aspect of the present invention, there is provided a reader/writer including a buffer means for temporarily storing signals to be transferred between the external host computer and noncontact IC card.

According to the third aspect of the present invention, there is provided a reader/writer including a repetitive transmission means for fetching or storing a signal from the external host computer, and repetitively transmitting the signal to the noncontact IC card until a response is returned from the noncontact IC card.

According to the fourth aspect of the present invention, there is provided a reader/writer including a formatting means that, when formatting or re-formatting a noncontact IC card, transmits a command at a plurality of baud rates sequentially until a response is returned from the noncontact IC card, and processes subsequent jobs at to a baud rate to which the noncontact IC card responds.

According to the fifth aspect of the invention, there is provided a reader/writer including an external-noise incorrect reception prevention means for preventing incorrect reception of external noise mistaken for an electromagnetic-wave signal sent from the noncontact IC card.

According to the sixth aspect of the present invention, there is provided a reader/writer including a start flag setting means for setting a leading code of an electromagnetic-wave signal to an inherent value so as to indicate that the electromagnetic-wave signal transmitted originates from the reader/writer.

According to the seventh aspect of the present invention, there is provided a noncontact IC card system permitting communication between an external host computer and a noncontact IC card. The noncontact IC card system comprises an external host computer, a noncontact IC card, and a reader/writer assisting in communication between the external host computer and noncontact IC card. The reader/ writer includes an input/output means electrically linked to the external host computer and designed to input or output bidirectional signals from or to the external host computer, a control means electrically connected to the input/output means and designed to transfer signals between the external host computer and noncontact IC card, and an electromagnetic wave transmitter/receiver means electrically connected to the control means and designed to transmit or receive bidirectional electromagnetic-wave signals to or from the noncontact IC card. The control means determines whether a signal has been received from the external host computer via the input/output means. If a signal has been received, it is determined whether the signal is a command or data. If the signal is a command, the command is executed. If the signal is data, the data is transmitted to the noncontact IC card via the electromagnetic wave transmitter/receiver means. If no signal has been received, it is determined whether a signal has been received from the noncontact IC card via the electromagnetic wave transmitter/receiver means. If a signal has been received, the signal is transmitted to the external host computer via the input/output means.

According to the eighth aspect of the present invention, there is provided a noncontact IC card system in which an external host computer has a command output means for outputting a Change command instructing that setting of a noncontact IC card be changed and an End command instructing that the noncontact IC card be placed in sleep mode to the noncontact IC card via a reader/writer, and in which a noncontact IC card has a setting change means for receiving a Change command, returning a result of executing the Change command to the reader/writer at a setting prior to changing, and then changing the setting of the noncontact IC card according to the Change command.

According to the ninth aspect of the present invention, there is provided a noncontact IC card system that includes a buffer means for temporarily storing signals sent from an external host computer at a high transfer rate, and that transmits signals sent from the external host computer after temporarily placing them in the buffer means, and transmits signals sent from the noncontact IC card directly to the external host computer without storing them.

According to the tenth aspect of the present invention, there is provided a noncontact IC card system including an incorrect reception prevention means for preventing incorrect reception by setting a leading code of an electromagnetic-wave signal sent from a reader/writer and a leading code of an electromagnetic-wave signal sent from an noncontact IC card to mutually different values.

In the reader/writers and noncontact IC card system according to the first to seventh aspects, the control means incorporated in the reader/writer determines whether a signal has been received from the external host computer via the input/output means. If a signal has been received, it is determined whether the signal is a command or data. If the signal is a command, the command is executed. If the signal is data, the data is transmitted to the noncontact IC card via the electromagnetic wave transmitter/receiver means. If no signal has been received, it is determined whether a signal has been received from the noncontact IC card via the electromagnetic wave transmitter/receiver means. If a signal has been received, the signal is transmitted to the external host computer via the input/output means.

According to the second aspect of the present invention, when a baud rate agreed between an external host computer and a reader/writer is different from the one agreed between the reader/writer and a noncontact IC card, signals to be transferred between the external host computer and noncontact IC card are stored temporarily.

According to the third aspect of the present invention, a reader/writer fetches a signal sent from an external host computer, and transmits the signal repetitively to the noncontact IC card until a response is returned from the noncontact IC card.

According to the fourth aspect of the present invention, for formatting or re-formatting a noncontact IC card, a command is transmitted uninterruptedly to a noncontact IC card at a plurality of baud rates and subsequent jobs are processed at a baud rate to which the noncontact IC card responds.

According to the fifth aspect of the present invention, it is prevented that external noise may be mistaken for a signal sent from a noncontact IC card and then received.

According to the sixth aspect of the present invention, a reader/writer includes a start flag setting means for setting a start flat that is a leading code of an electromagnetic-wave signal originating from the reader/writer to an inherent value. Even when a plurality of reader/writers are employed, a reader/writer from which an electromagnetic-wave signal originates can be distinguished from others by checking the value of a start flag.

According to the eighth aspect of the present invention, even when a noncontact IC card receives a Change command from an external host computer via a reader/writer, the noncontact IC card does not actually perform changing until it receives an End command after returning a result of execution to the reader/writer.

According to the ninth aspect of the present invention, when a baud rate agreed between an external host computer and a reader/writer is very high, the reader/writer transmits signals sent from the external host computer sequentially to a noncontact IC card after temporarily storing them, and transmits signals sent from the noncontact IC card directly to the host computer without storing them.

According to the tenth aspect of the present invention, an incorrect reception prevention means is included to specify mutually different codes for a start flag of an electromagnetic-wave signal sent from a reader/writer and a start flag of an electromagnetic-wave signal sent from a noncontact IC card respectively. Even when a plurality of reader/writers are installed adjacently, it is prevented that a reader/writer mistakes an electromagnetic-wave signal from other reader/writer for a signal sent from a noncontact IC card and receives the electromagnetic-wave signal.

BRIEF DESCRIPTION OF THE DRAWINGS

FIG. 16 is an outline flowchart concerning the seventh embodiment;

FIG. 17 shows checksums;

FIG. 18 shows a memory map showing checksums in a data memory in the ninth embodiment;

DETAILED DESCRIPTION OF THE PREFERRED EMBODIMENTS

First Embodiment

Figure 1:
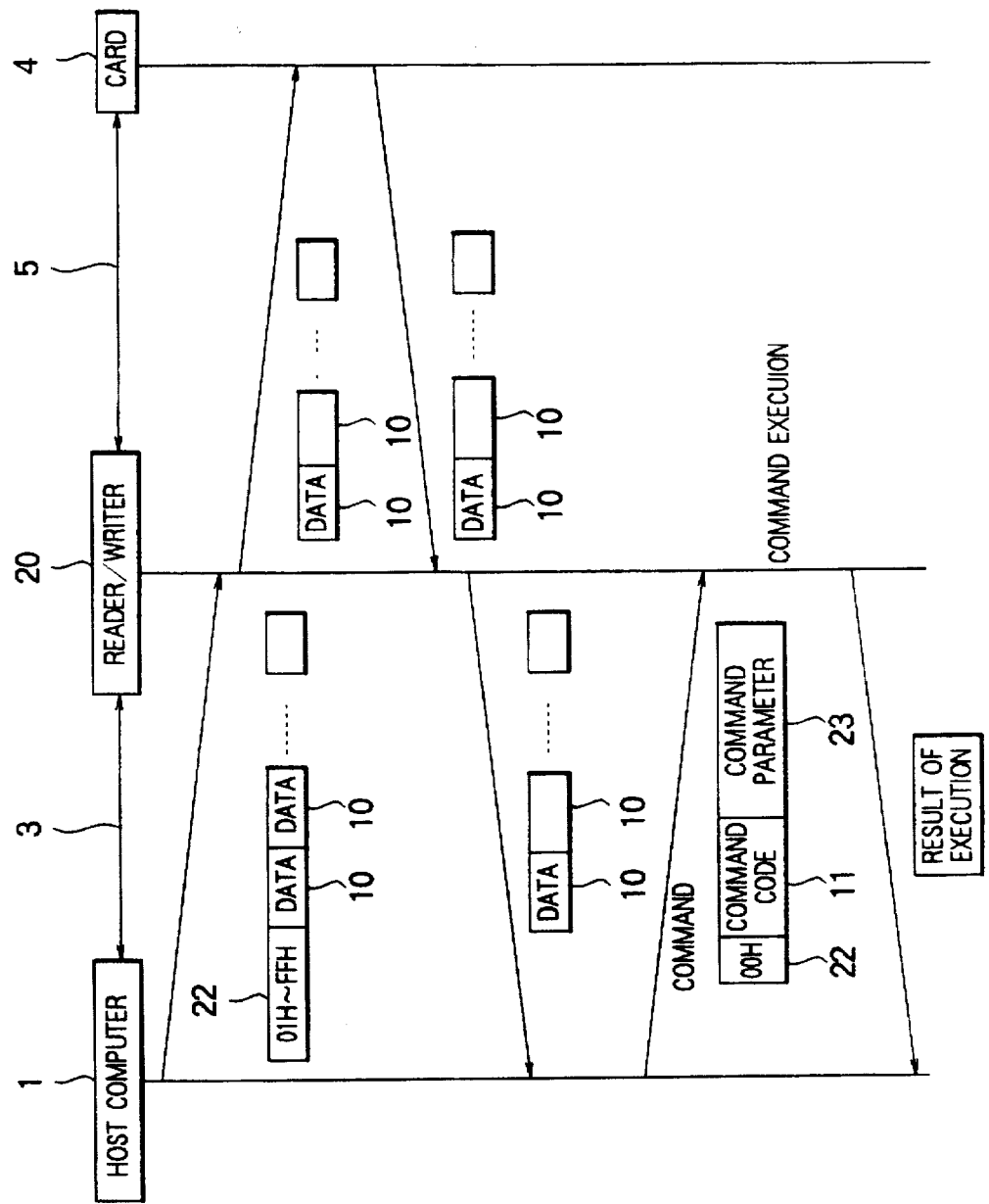
FIG. 1 shows a protocol established in a noncontact IC card system of the first embodiment.
Figure 21:
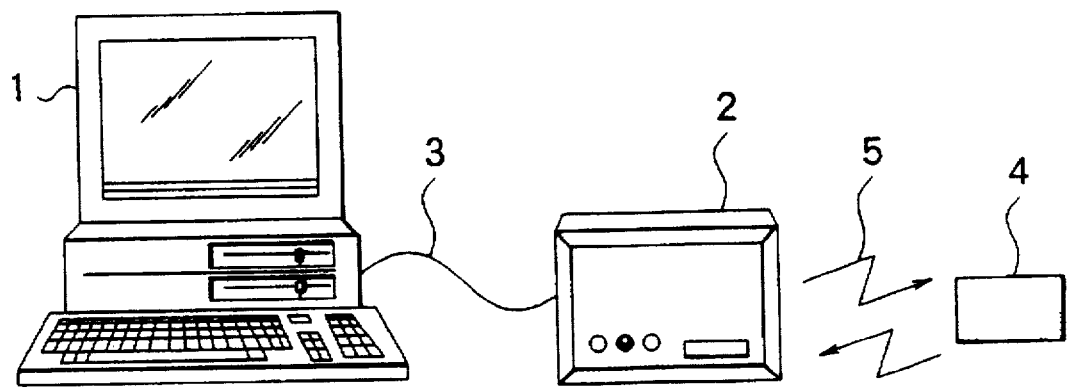
FIG. 21 shows connections made in a privately known noncontact IC card system.
Figure 22:
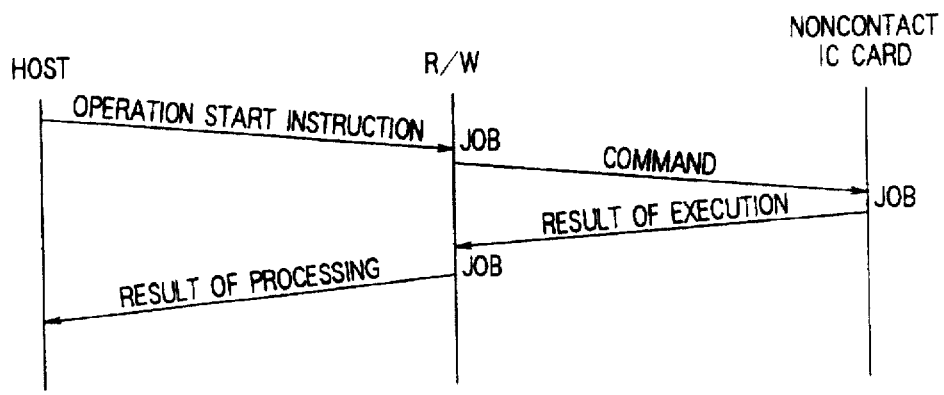
FIG. 22 shows a protocol established in the known noncontact IC card system.

FIG. 1 shows a protocol that is established in a noncontact IC card system according to the first embodiment of the present invention. In order to define communication among a host computer 1, a reader/writer 20, and a noncontact IC card 4. The host computer 1, reader/writer 20, and noncontact IC card 4 are interconnected as shown in FIG. 21. Herein, the connections will be described briefly. As shown in FIG 1, the host computer 1 and reader/writer 20 are electrically linked to each other by way of a communication line 3 conformable to the RS-232C standard or the like. The reader/writer 20 and noncontact IC card 4 communicate with each other in a noncontact fashion by means of electromagnetic waves 5. Next, the actions will be described. As shown in FIG. 1, when intending to send transmission data 10 (a command to be sent to the noncontact IC card 4) to the noncontact IC card 4, the host computer 1 appends a transmission data count code 22 indicating the number of data items in transmission data 10 to the start of a transmission data stream including the transmission data 10, and then transmits the resultant transmission data to the reader/writer 20. The reader/writer 20 receives the transmission data 10 from the number of data items indicated by the transmission data count code 22, converts the transmission data 10 into an electromagnetic-wave signal, and supplies the electromagnetic-wave signal to the noncontact IC card 4. For receiving data from the noncontact IC card 4, the reader/writer 20 demodulates reception data 10 received from the noncontact IC card 4 and transmits the resultant data to the host computer 1.

The reader/writer 20 itself has commands for use in controlling the reader/writer 20. When receiving a command, from the host computer 1 instructing that a carrier frequency or baud rate be changed, the reader/writer 20 executes the command and returns a result of the execution to the host computer 1. As for determining whether data sent from the host computer 1 is transmission data or a command, it is defined that when the transmission data count code 22 represents a "0", the data which is sent from the host computer 1 is a command. When transmitting a command, as shown in FIG. 1, the host computer 1 may provide a command code 11 with a code 23 indicating for example, a command parameter, if necessary. When the reader/writer 20 returns a result of executing a command which is sent from the host computer 1 to the host computer 1, if the command sent from the host computer 1 is a register read command, the reader/writer 20 returns a read value. If the command sent from the host computer 1 is not a register read command, the reader/writer 20 returns a value of, for example, 00H to indicate that command execution is completed.

Unlike the known reader/writer 2 as described above, the reader/writer 20 of the present invention does not process jobs including production of a command to be sent for the noncontact IC card 4 but merely modulates and demodulates transmitted and received data and converts serial data into parallel data or vice versa. Thus, data is transmitted or received.

Figure 3:
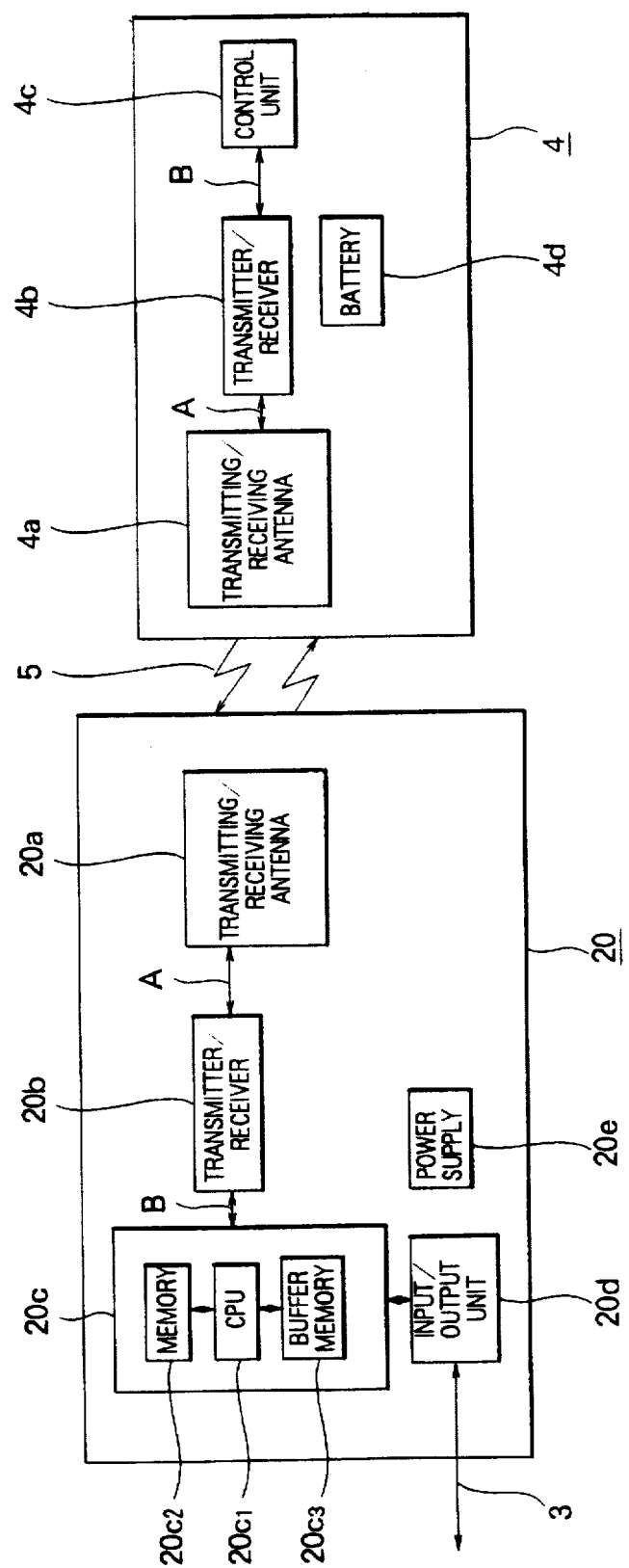
FIG. 3 is a block diagram showing a reader/writer and a noncontact IC card in the first embodiment.

FIG. 3 is a block diagram showing the reader/writer 20 and noncontact IC card 4 of the present invention. As illustrated, the reader/writer 20 and noncontact IC card 4 have transmitting/receiving antennas 20a and 4a respectively. The transmitting/receiving antennas 20a and 4a transmit or receive electromagnetic waves 5 and convert the electromagnetic waves into signal waves or vice versa. The transmitting/receiving antennas 20a and 4a are electrically connected to transmitter/receivers 20b and 4b. The transmitter/receivers 20b and 4b are composed of UARTs or the like, and carry out modulation and demodulation of signal waves and conversion between serial and parallel data. The transmitting/receiving antennas 20a and 4a, and the transmitter/receivers 20b and 4b constitute electromagnetic wave transmitter/receiver means for transmitting and receiving bidirectional electromagnetic-wave signals. The transmitter/receivers 20b and 4b are electrically connected to control units 20c and 4c respectively. The control unit 20c incorporated in the reader/writer 20 is electrically connected to an input/output unit 20d enabling bidirectional communication with the host computer 1 (See FIG. 21) over the communication line 3. The input/output unit 20d comprises input/output means. The control unit 20c, which comprises control means, incorporated in the reader/writer 20 transfers signals and data to and from the transmitter/receiver 20b and input/output unit 20d. The control unit 4c incorporated in the noncontact IC card 4 transfers signals and data to and from the transmitter/receiver 4b. The control units 20c and 4c control the whole of the reader/writer 20 and noncontact IC card 4, respectively. As shown in FIG. 3, the reader/writer 20 includes a power supply 20e, while the noncontact IC card 4 includes a battery 4d. The control unit 20c in the reader/writer 20 of the present invention comprises a CPU 20c1, a memory 20c2 for storing programs that control the actions of the CPU 20c1, and a buffer memory 20c3 for temporarily storing communication data and for use as a working memory required for running of programs.

In this embodiment, the buffer memory 20c3 is incorporated in the control unit 20c in the reader/writer 20. Alternatively, the buffer memory may be incorporated in the transmitter/receiver 20b or input/output unit 20d. Otherwise, the buffer memory may be realized as a separate unit and electrically connected to the transmitter/receiver 20b, input/output unit 20d, and control unit 20c over an internal bus (not shown).

Figure 2:
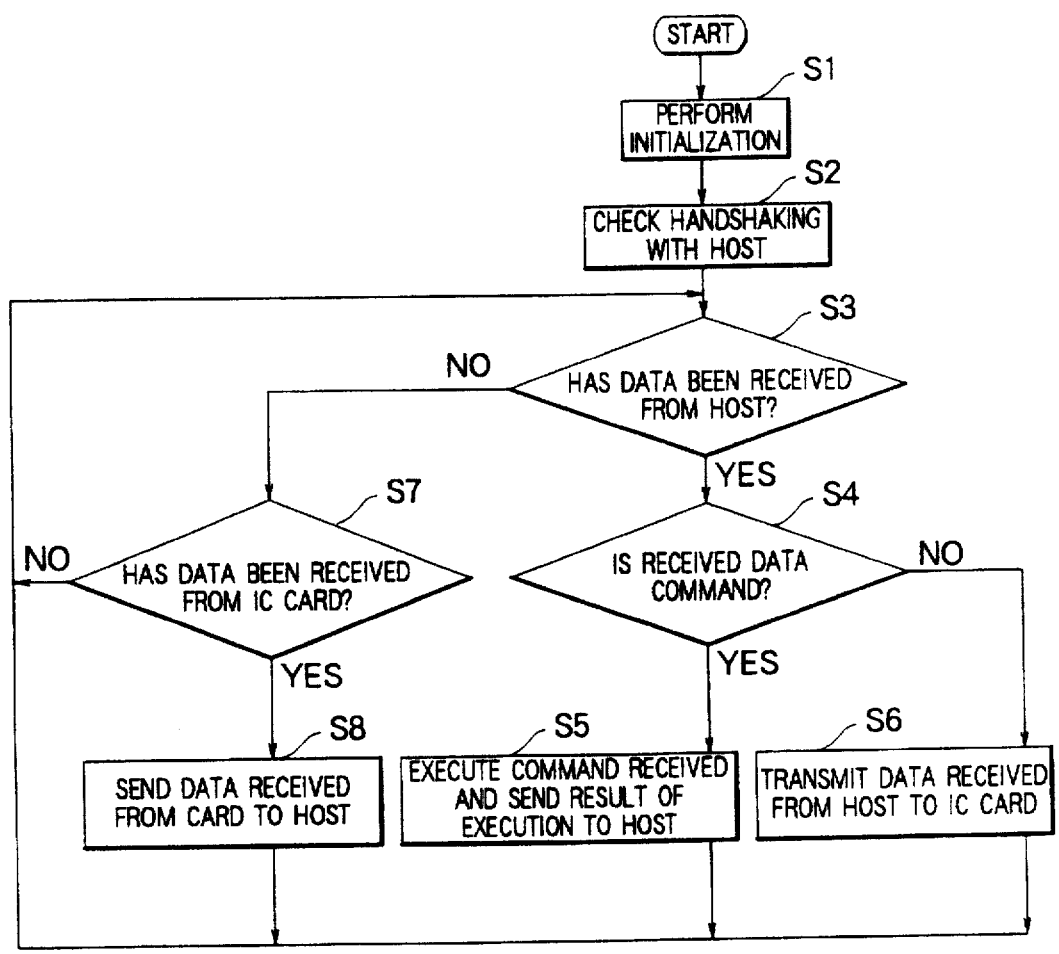
FIG. 2 is a outline flowchart concerning the first embodiment.

FIG. 2 is a outline flowchart. First, the reader/writer 20 performs initialization (step S1). The reader/writer 20 then does handshaking with the host computer 1, if necessary (step S2). During handshaking, it is determined whether communication with the host computer 1 is enabled. Handshaking is achieved, for example, by returning one byte taken from among data received from the host computer 1 to the host computer 1 or by transmitting an identification code pre-set in the reader/writer 20 to the host computer 1. The reader/writer 20 then determines whether data has been received from the host computer 1 (step S3). The reader/writer 20 is designed to handle data (transmission data or a command) sent from the host computer 1 with higher priority than transmission data sent from the noncontact IC card 4. When receiving data from the host computer 1, the reader/writer 20 checks if the transmission data count code 22 appended to the start of data represents a "0" so as to determine whether received data is a command or transmission data (step S4). If received data is a command, the command is executed and a result of the execution is sent to the host computer 1 (step S5). If the received data is transmission data, the transmission data is sent to the noncontact IC card 4 (step S6). When it is determined at step S3 that no data has been received from the host computer 1, it is determined whether data has been received from the noncontact IC card 4 (step S7). When data has been received from the noncontact IC card 4, the received data is sent to the host computer 1 (step S8). Herein, step S7 may be designed so that a communication error occurring during data reception may be detected. In this case, as shown in FIG. 2, step S7 is designed so as to return to step S3 when a communication error occurs. Alternatively, communication error detection may or may not be performed depending on a command.

Figure 4:
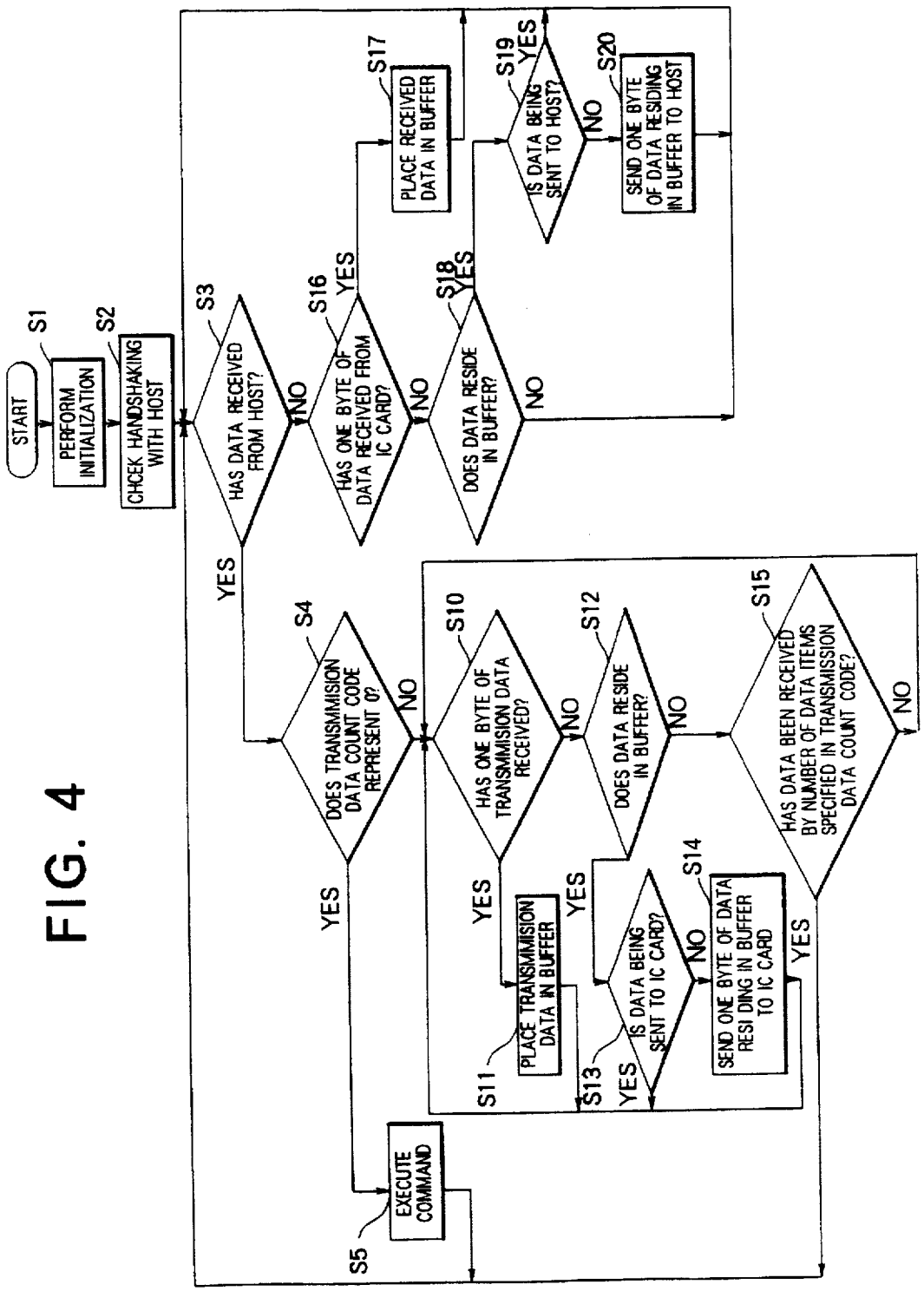
FIG. 4 is an outline flowchart describing buffering in the first embodiment.

The reader/writer 20 in accordance with the present invention has the buffer memory 20c3 for buffering transmission data sent from the host computer 1 and reception data sent from the noncontact IC card 4. Therefore, by using the buffer memory 20c3, even when a baud rate agreed between the host computer 1 and reader/writer 20 is different from that agreed between the reader/writer 20 and noncontact IC card 4, data can be transmitted or received to or from the noncontact IC card 4 irrespective of the baud rate difference. FIG. 4 is a flowchart describing buffering. Steps identical to those in FIG. 2 are assigned the same reference numerals, of which description will be omitted. To begin with, a procedure of receiving data from the host computer 1 will be described. When determining that data received from the host computer 1 is transmission data (step S4), the reader/writer 20 receives the transmission data in units of one byte (step S10) and buffers it in the buffer memory 20c3 sequentially (step S11). At the same time, it is determined whether data are stored in the buffer memory 20c3 at regular intervals (step S12). If data are stored in the buffer memory 20c3, the data are sent to the noncontact IC card 4 (steps S13 and S14). If data are not stored in the buffer memory 20c3, next, it is determined whether data has been received from the host computer 1 by the number of data items specified in the transmission data count code 22 (step S15). If data has not been received from the host computer 1, control is returned to step S10 and data reception is continued. If data has been received, control is returned to step S3.

Next, a procedure of receiving data from the noncontact IC card 4 will be described. The reader/writer 20 receives data from the noncontact IC card 4 in units of one byte (step S16) and buffers it in the buffer memory 20c3 sequentially (step S17). At the same time, it is determined at regular intervals whether data are stored in the buffer memory 20c3 (step S18). If data are stored in the buffer memory 20c3, the data is transmitted to the host computer 1 (steps S19 and S20). If no data are stored in the buffer memory 20c3, control is returned to step S3.

Figure 5:
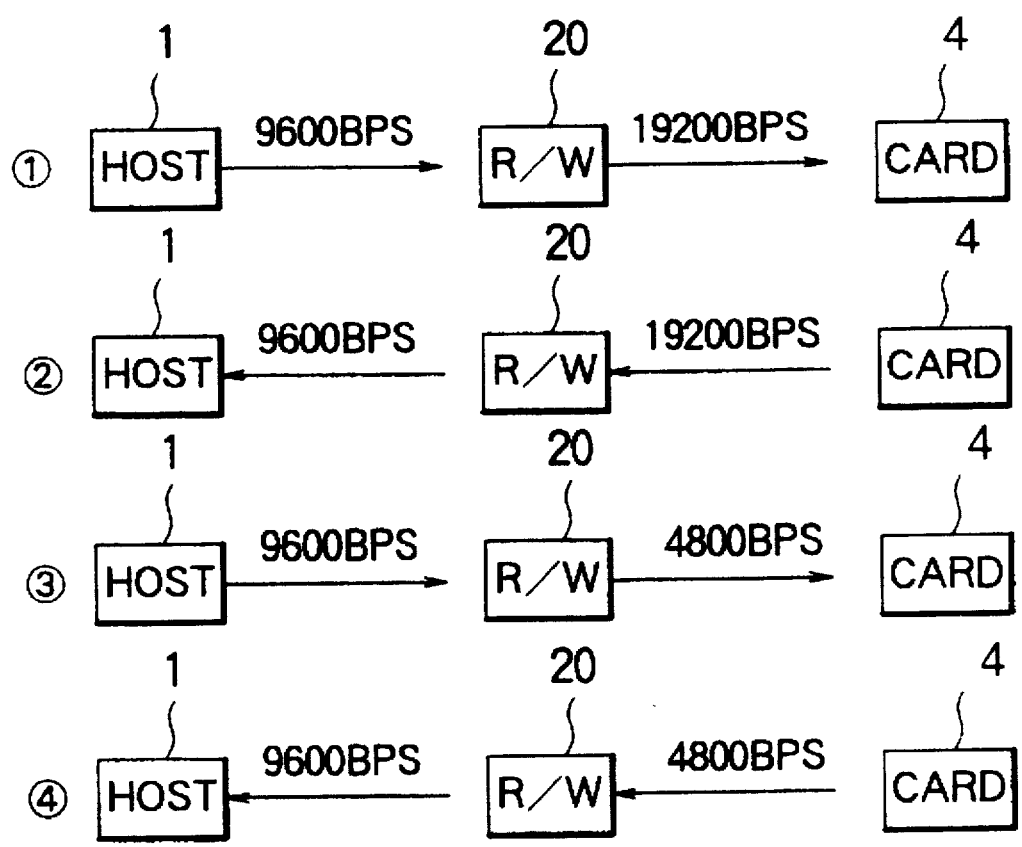
FIG. 5 shows differences in baud rate.

As mentioned above, for receiving transmission data from the host computer 1, the reader/writer 20 in accordance with the present invention receives the data in units of one byte and transmits the data to the noncontact IC card 4 concurrently. For receiving data from the noncontact IC card 4, the reader/writer 20 receives the data in units of one byte and transmits it to the host computer 1 concurrently. Consequently, as shown in ① and ② cases in FIG. 5, when a baud rate agreed between the host computer 1 and reader/writer 20 is 9600 bps and a baud rate agreed between the reader/writer 20 and noncontact IC card 4 is 19200 bps, since data transfer between the reader/writer 20 and noncontact IC card 4 is faster than that between the host computer 1 and reader/writer 20, the reader/writer 20 transmits data received from the host computer 1 to the noncontact IC card 4 without buffering it, and transmits data received from the noncontact IC card 4 sequentially to the host computer 1 after buffering it. In cases ③ and ④ in FIG. 5, data transfer between the reader/writer 20 and noncontact IC card 4 is slower than that between the host computer 1 and the reader/writer 20. In the case of ③ in FIG. 5, buffering is carried out. In the case of ④ in FIG. 5, data is transmitted without being buffered.

As mentioned above, the reader/writer 20 has neither a command destined for the noncontact IC card 4 nor the ability to process a result of transmission or reception. Even if an application program running in the noncontact IC card 4 or host computer 1 is changed, software implemented in the reader/writer 20 need not be modified. The actions of the reader/writer 20 are so simple as to be understood clearly. Programs for the host computer 1 can therefore be designed easily.

Second Embodiment

Figure 6:
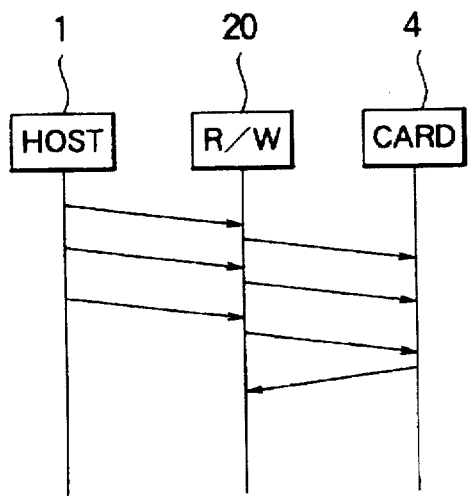
FIG. 6 shows a protocol concerning the first embodiment.
Figure 7:
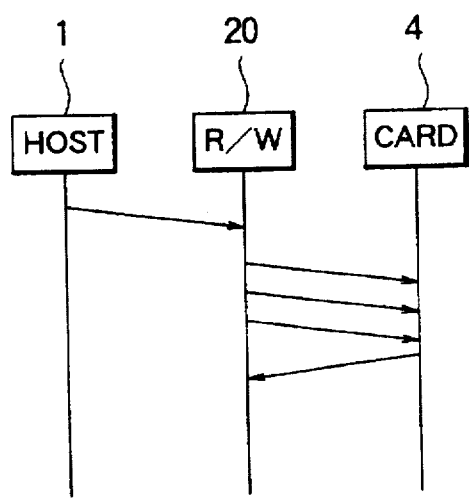
FIG. 7 shows a protocol defining a repetitive data transmission command in the second embodiment.
Figure 10:
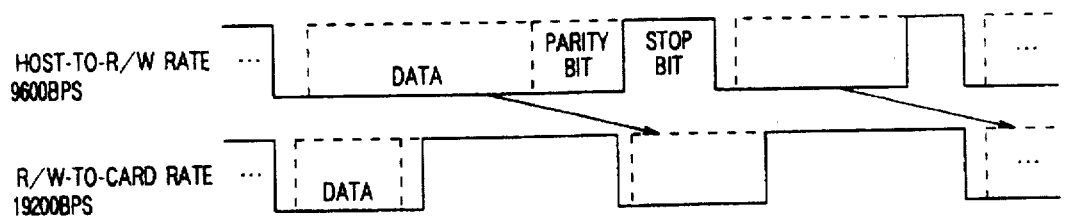
FIG. 10 is a timing chart indicating data spacings associated with different baud rates in the first embodiment.
Figure 27:
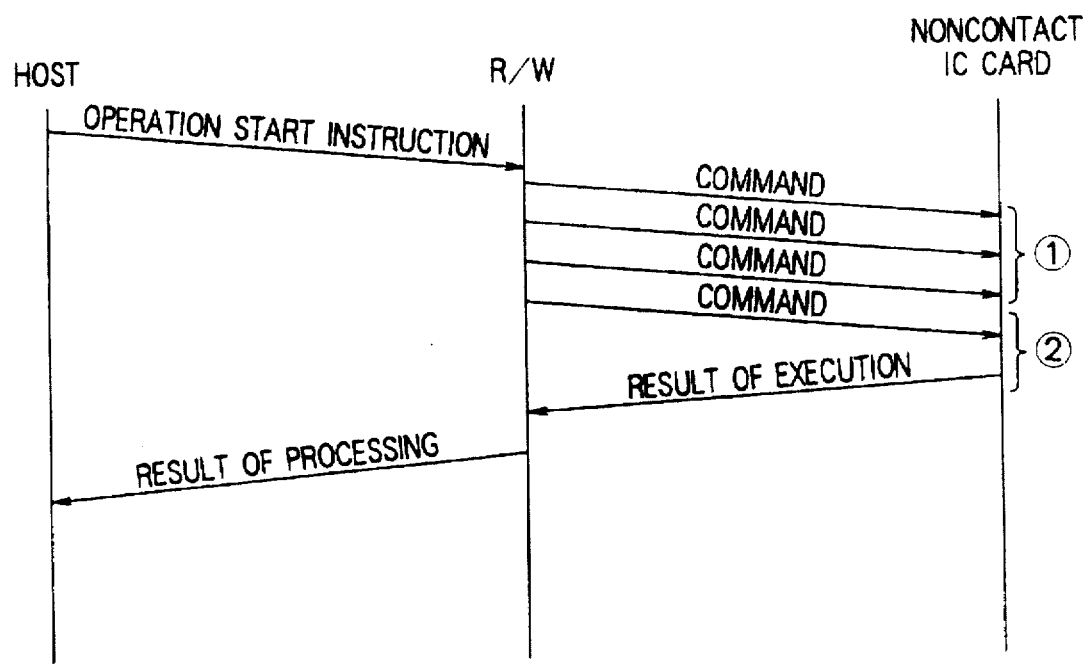
FIG. 27 shows a protocol established in the known noncontact IC card system.
Figure 28:
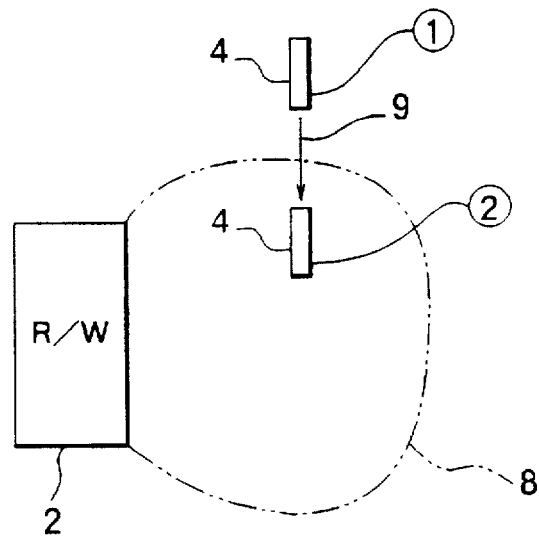
FIG. 28 is a top view showing an access area in which communication with a reader/writer is enabled.

In this embodiment, the reader/writer 20 as shown in the first embodiment further has a repetitive data transmission command serving as a repetitive transmission means. This helps lighten the load to the host computer 1. FIG. 7 shows a protocol employed in this embodiment. When a command is sent from the reader/writer 20, if the noncontact IC card 4 is not installed within the access area 8, the noncontact IC card 4 is moved gradually in the direction of an arrow 9 as shown in FIG. 28 so that it will enter the access area 8 from outside of the access area 8. A command must therefore be issued repetitively to the noncontact IC card 4 until a response is returned from the noncontact IC card 4. In the aforesaid known system, as shown in FIG. 27, every time the host computer 1 issues a command, the reader/writer 2 processes jobs including repetitive production of a command destined for the noncontact IC card 4 until a response is returned from the noncontact IC card 4. Since the reader/writer 2 thus transmits data to the noncontact IC card 4, it must incur a heavy load. In the first embodiment, as shown in FIG. 6, every time the host computer 1 issues a command, the host computer 1 must repeatedly send data to the reader/writer 20 until a response is returned from the noncontact IC card 4. The host computer 1 must therefore bear a load. When a baud rate (9600 bps) agreed between the host computer 1 and reader/writer 20 is lower than a baud rate (19200 bps) agreed between the reader/writer 20 and noncontact IC card 4, as shown in FIG. 10, data transmitting intervals when data is repeatedly sent until a response is returned from the noncontact IC card 4 become equivalent to a data transfer rate available between the host computer 1 and reader/writer 20, though the baud rate available between the reader/writer 20 and noncontact IC card 4 is higher. A time interval after the reader/writer 20 transmits data to the noncontact IC card 4 until it receives subsequent data from the host computer 1 is wasted, thus deteriorating transmission efficiency.

In this embodiment, the reader/writer 20 has a repetitive data transmission command. Using the command, the reader/writer 20 can store data sent from the host computer 1 and supply the data repetitively until a response is returned from the noncontact IC card 4. The reader/writer 20 stores data sent from the host computer 1, whereby data transfer can be achieved at the data transfer rate (19200 bps) available between the reader/writer 20 and noncontact IC card 4. A data transmitting rest interval is equivalent to a bit length of a stop bit. Compared with data transfer shown in FIG. 10, more efficient data transfer is realized.

Figure 8:
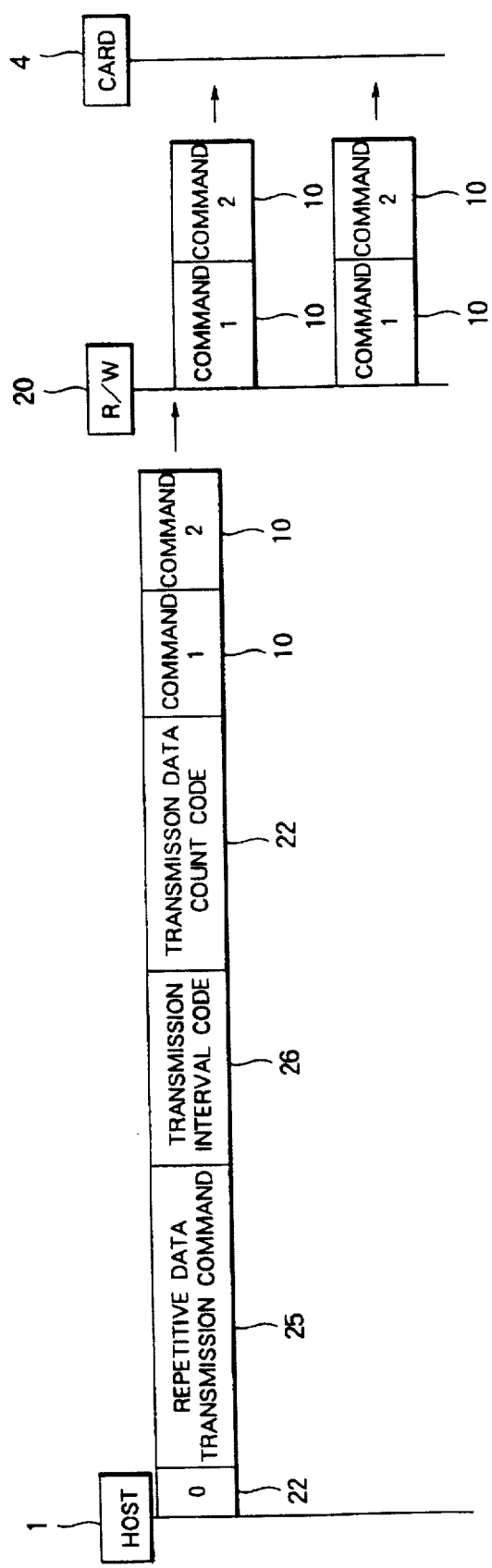
FIG. 8 shows a structure of a communication block containing communication data in the second embodiment.

FIG. 8 shows a data structure in a communication block in this embodiment. A communication block to be transmitted from the host computer 1 to the reader/writer 20 starts, similar to the one in the first embodiment, with the transmission data count code 22 that represents a "0" so as to indicate that the data is a command. The transmission data count code 22 is succeeded by a repetitive data transmission command code 25 indicating an instruction that the reader/writer 20 should repetitively transmit data. The repetitive data transmission command code 25 is succeeded by a transmission interval code 26 indicating a transmission spacing at intervals so that the reader/writer 20 transmits data repetitively. The transmission interval code 26 is followed by the same communication block as the one in the first embodiment (See FIG. 1). A communication block sent from the reader/writer 20 to the noncontact IC card 4 has, as shown in FIG. 8, the same data structure as the one in the first embodiment.

Figure 9:
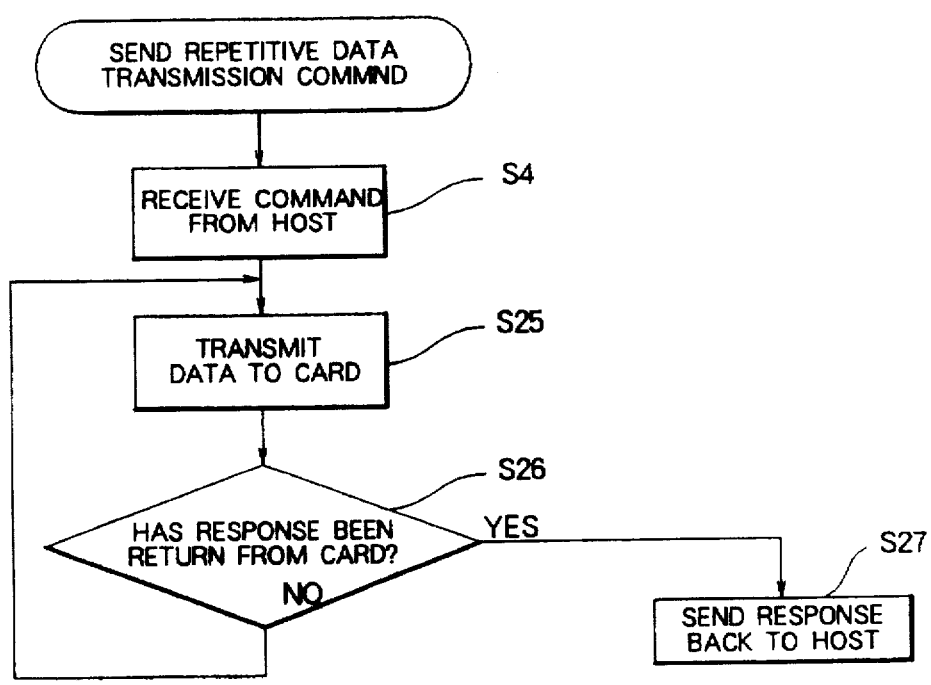
FIG. 9 is an outline flowchart concerning the second embodiment.

FIG. 9 is a flowchart concerning this embodiment. When a repetitive data transmission command 25 is sent as one code of a communication block structured as shown in FIG. 8 from the host computer 1, the reader/writer 20 identifies the command by checking the transmission data count code 22 (step S4), and transmits data to the noncontact IC card 4 (step S25). It is then determined whether a response has been returned from the noncontact IC card 4 (step S26). If no response has been returned, the data is transmitted repeatedly until a response is returned (steps S25 and S26). When it is determined that a response has been returned from the noncontact IC card 4 (step S26), the response is sent back to the host computer 1 (step S27).

Third Embodiment

Figure 11:
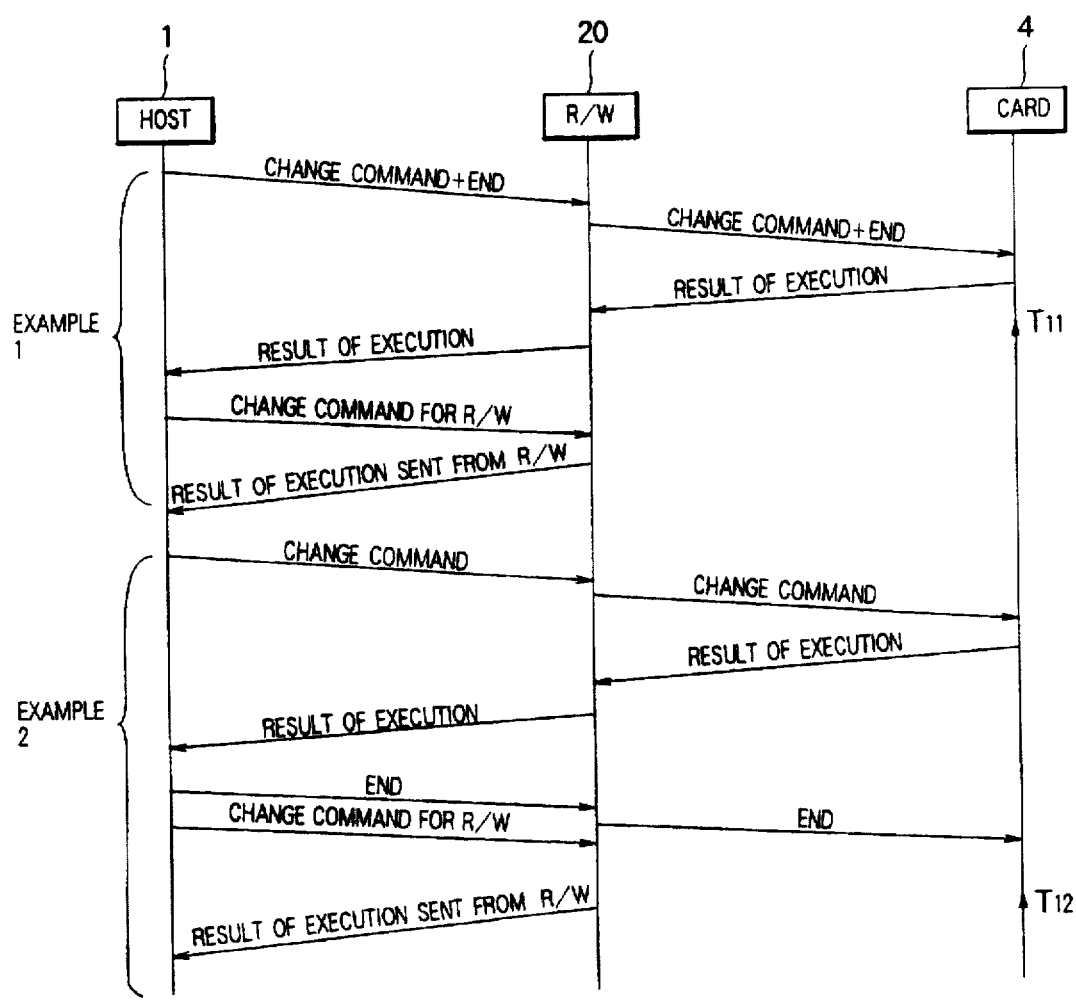
FIG. 11 shows a protocol concerning the third embodiment.
Figure 29:
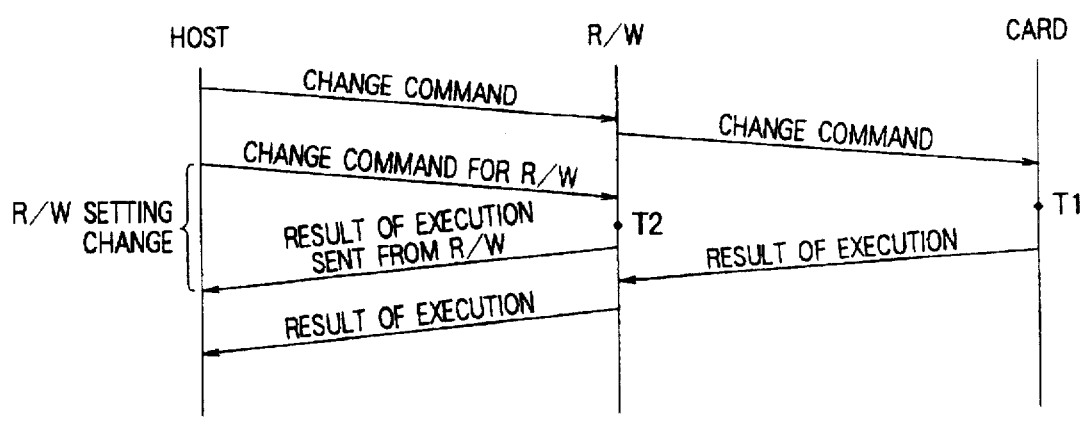
FIG. 29 shows a protocol defining changing of a baud rate or the like of a noncontact IC card in the known noncontact IC card system.

As described previously, according to the above-mentioned known system as shown in FIG. 29, when the carrier frequency or baud rate of the noncontact IC card 4 is changed, the noncontact IC card 4 executes a Change command upon receipt of it and sends back a result of the execution at a changed baud rate. Until the result of the execution is sent from the noncontact IC card 4 back to the reader/writer 2, the baud rate of the reader/writer 2 must be changed in conformity with the one of the noncontact IC card 4. The timing of changing is difficult to determine. The baud rate of the reader/writer 2 sometimes cannot be changed in time. In this embodiment, a noncontact IC card includes a setting change means that, when a carrier frequency or baud rate is changed, sends a result of executing a Change command at an unchanged baud rate, and changes a baud rate or the like immediately before entering a sleep state after receiving an End command. FIG. 11 shows a protocol employed in this embodiment. To begin with, example 1 in FIG. 11 will be described. When an End command indicating completion of communication immediately succeeding a Change command is sent from the reader/writer 20, the noncontact IC card 4 refrains from changing a baud rate or the list soon but returns a result of executing the Change command to the reader/writer 20 at the unchanged baud rate. Thereafter, the noncontact IC card 4 changes the baud rate at a time instant T11 immediately before entering a sleep state. After receiving the result of execution via the reader/writer 20, the host computer 1 sends a Change command to the reader/writer 20 indicating that the baud rate of the reader/writer 20 should be changed. In example 2 in FIG. 1, when an End command does not immediately succeed a Change command, the noncontact IC card 4 refrains from changing a baud rate or the like until it receives an End command, though it has already received a Change command. After receiving the End command, the noncontact IC card 4 changes the baud rate or the like at a time instant T12 immediately before entering a sleep state. After transmitting an End command to the reader/writer 20, the host computer 1 sends a Change command to the reader/writer 20 instructing that the baud rate of the reader/writer 20 be changed. In this embodiment, a result of executing the Change command is sent back to the reader/writer 20 at an unchanged baud rate. When the End command is received, the baud rate is changed immediately before the sleep state is established. Therefore, the reader/writer 20 cannot make preparations (changing of a baud rate or the like) in time for receiving a result of the execution from a noncontact IC card 4. Also, software to be run in the host computer 1 can be developed easily.

Fourth Embodiment

Figure 12:
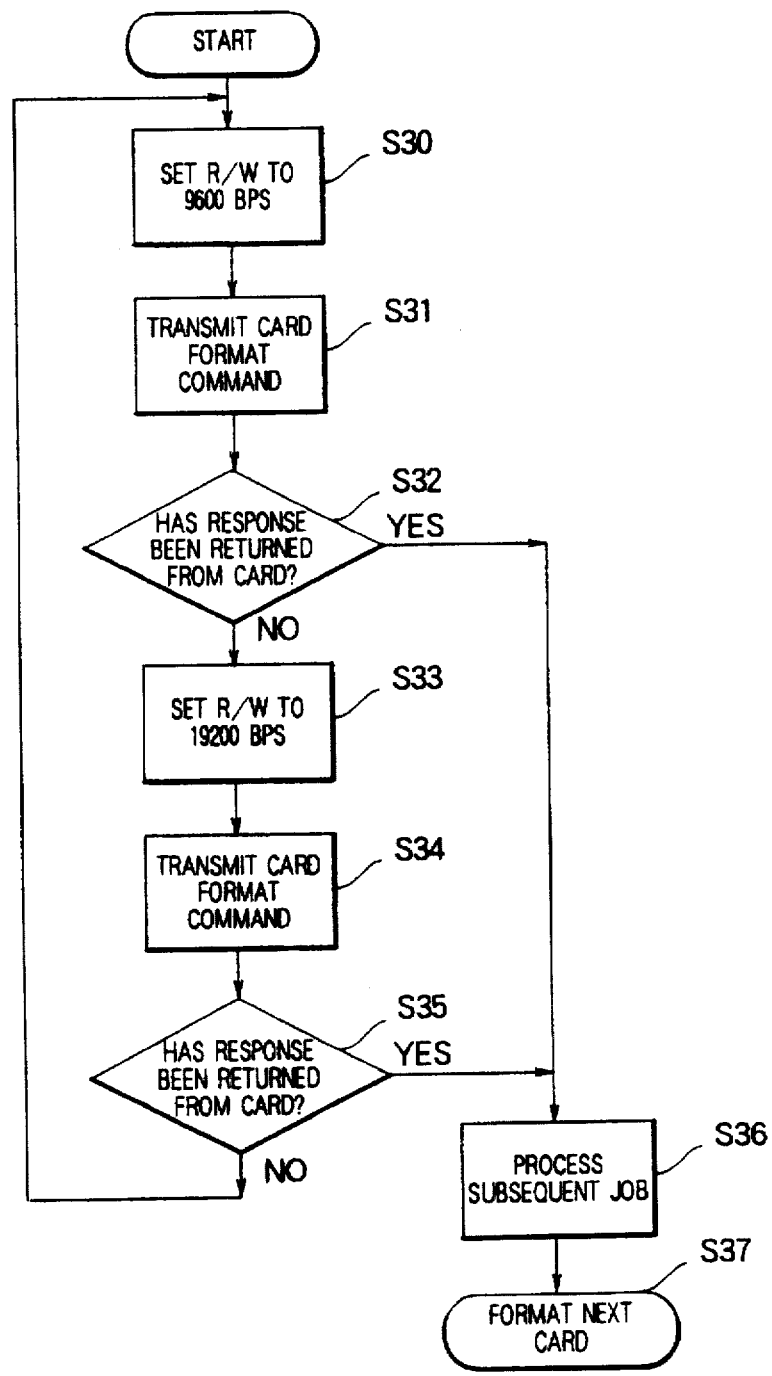
FIG. 12 is an outline flowchart concerning the fourth embodiment.
Figure 13:
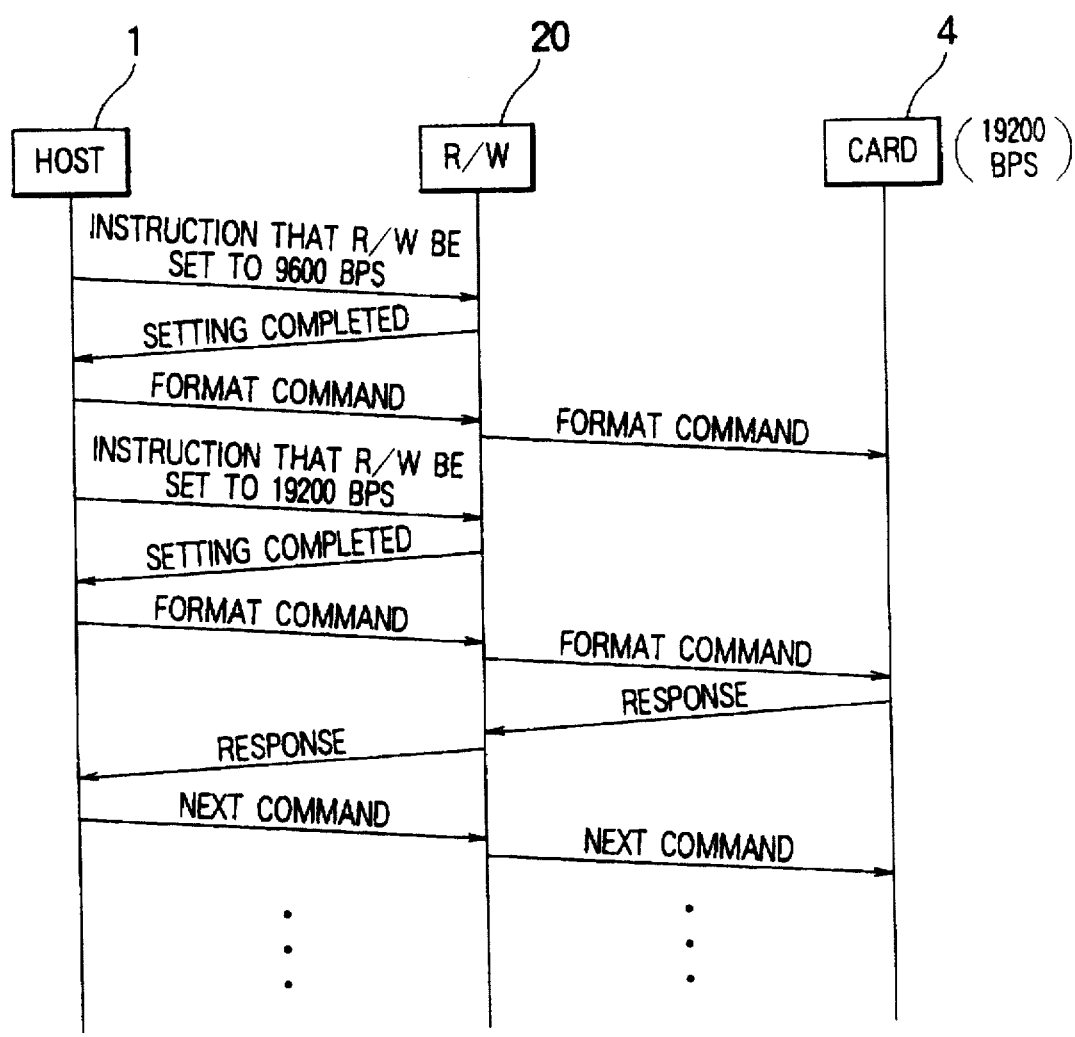
FIG. 13 shows a protocol concerning the fourth embodiment.

For formatting or re-formatting the noncontact IC card 4, a baud rate agreed between the reader/writer 20 and noncontact IC card 4 may be different from that under a system in which the noncontact IC card 4 has been used to operate before. In this case, according to the aforesaid known system, the noncontact IC card 4 cannot be re-formatted. For example, after a noncontact IC card set at 9600 bps is formatted at 19200 bps, the formatted noncontact IC card copes with the baud rate of 19200 bps. Under a system enabling formatting only at 9600 bps, the formatted noncontact IC card 4 coping with the baud rate of 19200 bps cannot be re-formatted. In this case, an operator has had to operate the host computer 1 to issue a command instructing that the baud rate be changed to the reader/writer 2. After the baud rate of the reader/writer 2 is thus changed, re-formatting is retried. In contrast, according to this embodiment, a formatting means is included so that the reader/writer 20 sends data to the noncontact IC card 4 at various baud rates in the course of formatting. This facilitates efficiency in formatting and leads to a reduction in operator's work. FIG. 12 is a flowchart concerning this embodiment. FIG. 13 shows a protocol employed in this embodiment. As shown in FIGS. 12 and 13, first, the reader/writer 20 is set to, for example, 9600 bps (step S30). A Format command is sent at a baud rate of 9600 bps (step S31). It is determined whether a response has been returned from the noncontact IC card 4 (step S32). If no response has been returned, the reader/writer 20 is reset to another baud rate, for example, 12900 bps (step S33). The Format command is sent again (step S34). Thus, the reader/writer 20 executes formatting using various baud rates. An operator need therefore not be conscious of whether the noncontact IC card 4 is to be formatted or re-formatted. The only work an operator must do is to install the noncontact IC card 4 within the access area 8. A noncontact IC card 4 can therefore be formatted or re-formatted quickly.

Fifth Embodiment

Figure 14:
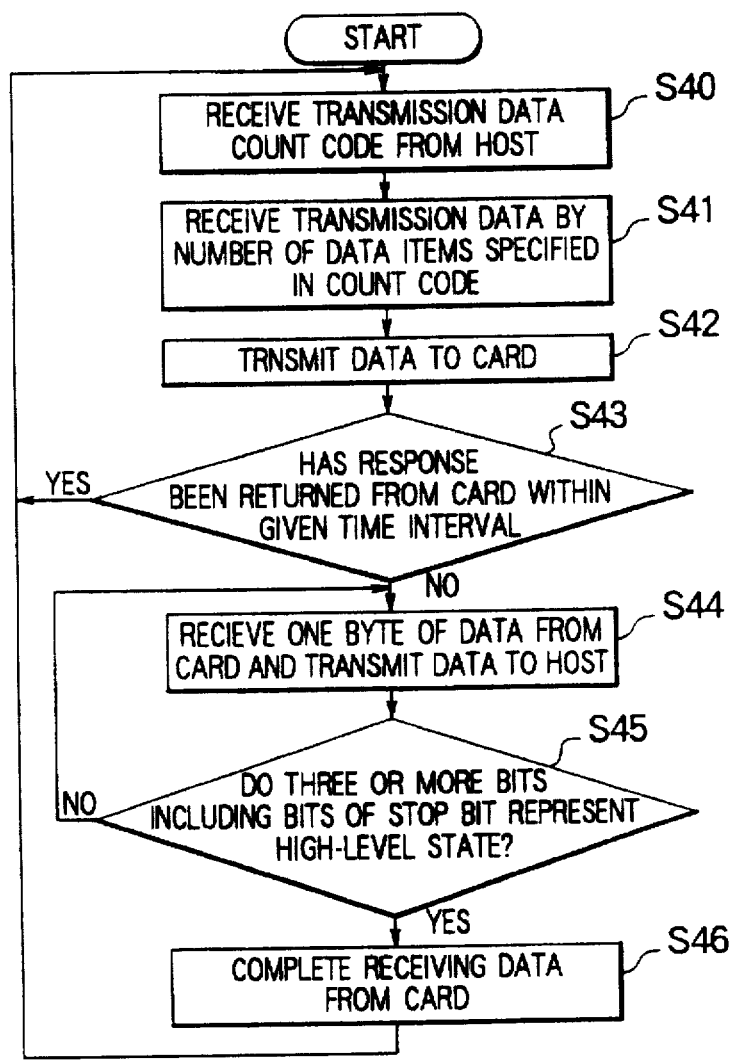
FIG. 14 is an outline flowchart concerning the fifth embodiment.
Figure 24:
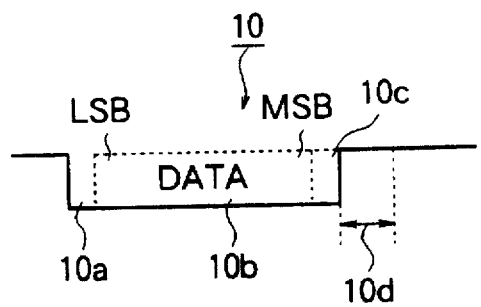
FIG. 24 shows a data structure of transmission data in the communication block in FIG. 23.

According to this embodiment, even when the data transfer rate available between the host computer 1 and reader/writer 20 is too high to timely run the software described in FIG. 4, the reader/writer 20 operates appropriately. FIG. 14 is a flowchart concerning this embodiment. In the sequence shown in FIG. 4, the reader/writer 20 receives data from the host computer 1 in units of one byte, determines whether data resides in the buffer, and transmits data to the noncontact IC card concurrently. In this embodiment, data is sent from the host computer at a very high transfer rate. The sequence shown in FIG. 4 therefore cannot be executed. As shown in FIG. 14, transmission data sent from the host computer 1 is placed temporarily in the buffer memory 20c3 (See FIG. 3) by the number of data items specified in the transmission data count code 22 (See FIG. 8) (Steps S40 and S41), and then sent to the noncontact IC card 4 (step S42). Reception data sent from the noncontact IC card 4 are received in units of one byte and transferred to the host computer 1 without being buffered (Step S44). Since the stop bit 10d (See FIG. 24) consists of two bits each representing a high-level state as described previously, the end of the reception data sent from the noncontact IC card 4 is recognized with the presence of three or more consecutive bits each representing the high-level state (steps S45 and S46). Thereby, even when the data transfer rate adopted by the host computer 1 is very high, the host computer 1 can consider that the reader/writer 20 operates just like in the first embodiment. Software implemented in the host computer 1 need not be modified.

Transmission data sent from the host computer 1 is buffered by the number of data items specified in the transmission data count code 22, and then the data is sent to the noncontact IC card 4. Alternatively, while transmission data sent from the host computer 1 is being buffered by a specified number of data items, the data may be sent sequentially to the noncontact IC card 4 concurrently. For the reader/writer 20 including a UART that does not has the ability to monitor a stop bit or that cannot use the ability during receiving (RXBUSY), completion of reception may be recognized with the absence of data for a duration equivalent of one byte or more (for the duration of RXBUSY) instead of the presence of three consecutive bits each representing the high-level state. This method also realizes high-speed data transfer by operating a reader/writer in the same manner as that in the first embodiment.

Sixth Embodiment

Figure 15:
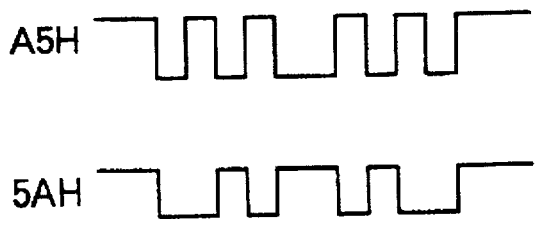
FIG. 15 shows waveforms of examples of a start flag in the sixth embodiment.
Figure 19:
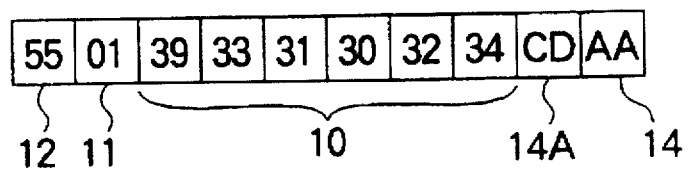
FIG. 19 is a memory map showing the checksums in the data memory in the ninth embodiment.
Figure 30:
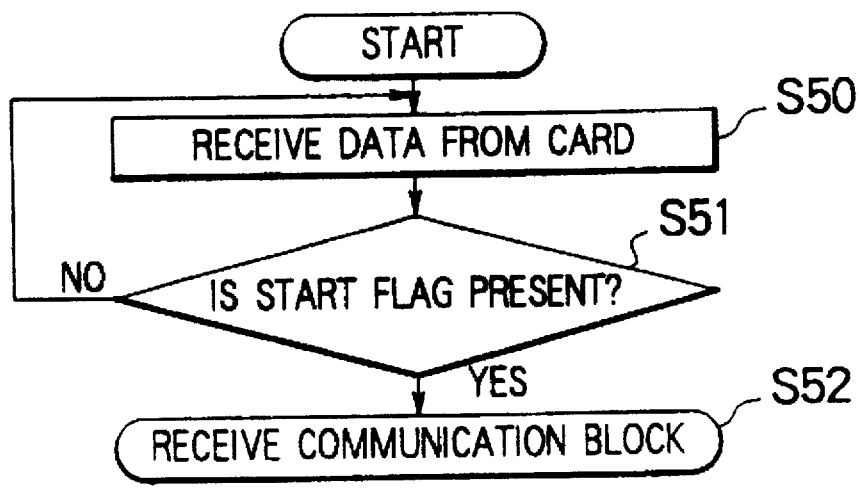
FIG. 30 is a flowchart describing a sequence starting reception of a communication block carried out by the known reader/writer.
Figure 31:
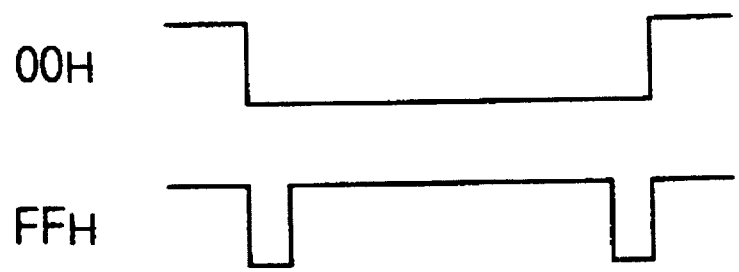
FIG. 31 shows waveforms of known start flags.

Even the above-mentioned known reader/writer 2 ignores all data, as seen from the flowchart of FIG. 30, until the start flag 12 comes. However, in the known system, as described previously, a start flag is defined as a value FFH or 00H (See FIG. 31). When the reader/writer 2 receives noise, since noise usually occurs at regular intervals, the reader/writer 2 may mistake the noise for the start flag. In this event, even if a correct communication block succeeding the noise is received, since the noise is mistaken for a start flag, a start point of reading data is shifted by the length of the start flag and thus the data cannot be received correctly. In this embodiment, an external noise incorrect reception prevention means is included to set a start flag to a complex code represented by an irregular waveform such as the waveform of A5H or 5AH shown in FIG. 15. This leads to improved reliability.

Seventh Embodiment

In this embodiment, two or more start flags, not one start flag, are used as an external noise incorrect reception prevention means. As seen from the flowchart of FIG. 16, the two or more start flags are checked for receiving data. Thus, it is prevented to receive noise as a start flag by mistake. According to this embodiment, reliable prevention of noise be received as a start flag is achieved. This leads to improved reliability.

Eighth Embodiment

In this embodiment, an incorrect reception prevention means is included to set a start flag for use in transmitting data from the noncontact IC card 4 to the reader/writer 20 and a start flag for use in transmitting data from the reader/writer 20 to the noncontact IC card 4, which are composed of mutually different codes. The incorrect reception prevention means may be incorporated in either the noncontact IC card 4 or reader/writer 20. In this embodiment, lot example, when a plurality of reader/writers 20 are arranged adjacent to each other, a reader/writer 20 can determine whether data originates from other reader/writer 20 or the noncontact IC card 4 merely by checking the code of a start flag. Therefore, mistaken reception of data sent to another reader/writer 20 from the noncontact IC card 4 is prevented. The data sent from the noncontact IC card 4 alone can be received correctly. Even in this embodiment, it be preferable that a start flag is set to a complex code represented by an irregular waveform. This is because, as described in conjunction with the sixth embodiment, mistaken receipt of external noise as a start flag can be reliably prevented. If necessary, as described in conjunction with the seventh embodiment, a plurality of start flags may be used.

Ninth Embodiment

In this embodiment, in consideration of the employment of a plurality of reader/writers 20, each of the reader/writers 20 is provided with a start flag setting means for setting a start flag to be sent from the associated reader/writer 20 to a code different from other codes. The noncontact IC card 4 or host computer 1 must respond to any start flag sent from any reader/writer 20. In this embodiment, since the start flags sent from the reader/writers 20 have mutually different codes, the noncontact IC card 4 or host computer 1 can identify a reader/writer 20 from which data is sent by checking the code of a start flag. Since a reader/writer 20 that is now transmitting data can be identified on the basis of a received start flag, the timing of transmissions to be made by the reader/writers 20 can be controlled effortlessly. For example, when one reader/writer 20 is now transmitting data, other reader/writers are restrained from transmission. Alternatively, after the reader/writer 20 that is now transmitting data completes transmission, other reader/writers 20 transmit data. Thus, the timing of transmissions made by the reader/writers 20 can be adjusted or controlled effortlessly.

Tenth Embodiment

Figure 25:
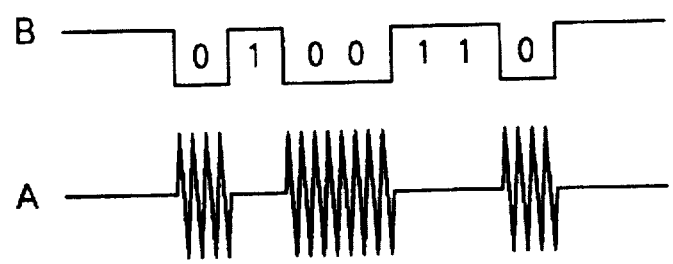
FIG. 25 shows waveforms concerning an ASK modulation form.
Figure 26:
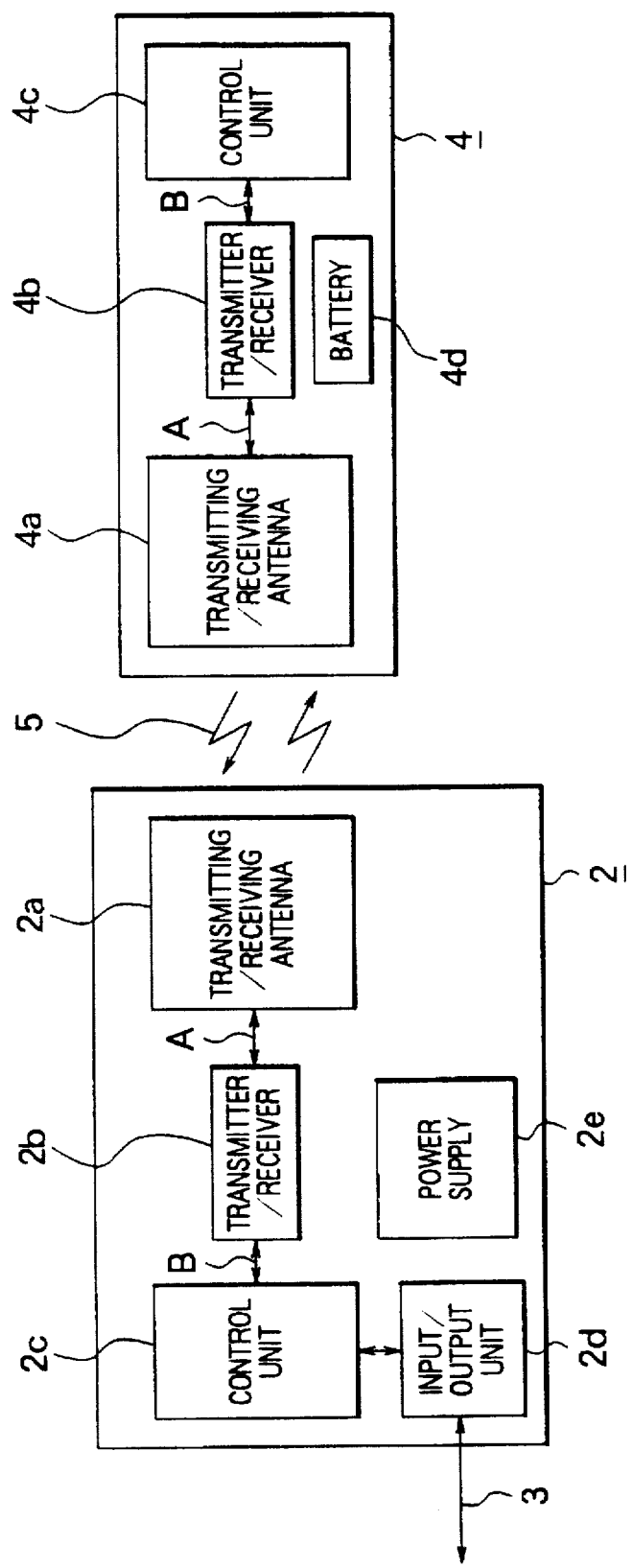
FIG. 26 is a block diagram showing the known reader/writer and noncontact IC card.

In this embodiment, a free memory area in a noncontact IC card is padded with a code other than 00H. The reader/writer in accordance with the present invention, similar to the known one, adopts the ASK modulation form. In ASK modulation, as shown in FIG. 25, a logical 0 or 1 is represented by the presence or absence of an electromagnetic wave. When the noncontact IC card 4 is located on the boundary of the access area 8 (See FIG. 28) in which the reader/writer 20 is accessible, data misrepresentation is likely to occur. As a result, for example, 00H may be misrepresented as 80H or C0H. In the past, a free memory area in a data memory in the noncontact IC card 4 has been padded with 00H. Since 00H has often been transmitted repetitively, 00H has often been misrepresented as 80H or C0H. Moreover, a computer usually handles data in units of a multiple of 4, and a checksum is determined by using eight low-order bits alone. When 80H is present in a multiple of 2 and C0H is prevent in a multiple of 4, as shown in FIG. 17, the checksum 14 represents the same value as the value provided when 00H is present in a multiple of 2 or 4. It is therefore hard to detect an error. According to this embodiment, a free memory area in a data memory is padded with any code other than 00H. Even if data misrepresentation occurs, there is little possibility that the checksum corresponds to a predetermined value. This facilitates efficiency in data detection.

Eleventh Embodiment

Figure 23:
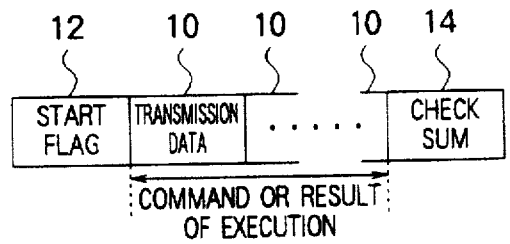
FIG. 23 shows a data structure in a communication block to be transferred between the known reader/writer and noncontact IC card.

In this embodiment, two checksums, that is, a checksum regarding a whole communication block and a checksum for use in checking the contents of each transmission data 10 are included to improve efficiency in error detection. In the known system, as shown in FIG. 23, a checksum one byte long is appended to the end of a communication block. In this embodiment, as shown in FIG. 18, a checksum 14A is appended to the end of each transmission data 10 representing a card number, name, or date of formatting. When each transmission data 10 is written in the noncontact IC card 4, the checksum 14A is calculated by the reader/writer 20 and appended to the end of each transmission data 10. The checksum 14 associated with a whole communication block is calculated by adding up all bytes, including the checksums 14A associated with respective transmission data 10, from the start flag 12 to the checksum 14 exclusive of the checksum 14. The application program running in the noncontact IC card 4 may not be modified in particular, but double checking can be achieved owing to the checksums. For communication, transmission data 10 is usually handled independently. The checksum 14A appended to the end of each transmission data is helpful in detecting an error in the transmission data.

Twelfth Embodiment

Figure 20:
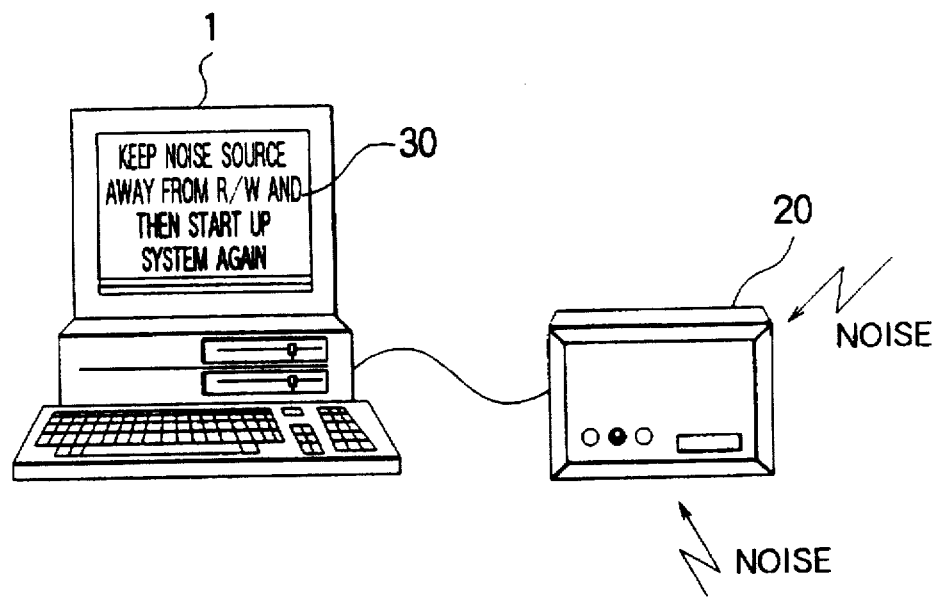
FIG. 20 is a front view showing a host computer displaying an error message on an output unit, and a reader/writer in the tenth embodiment.

As shown in FIG. 20, assuming that the reader/writer 20 is installed near a display unit or switching power supply, if the reader/writer 20 receives noise during system startup, communication with the noncontact IC card 4 may not proceed normally. In this embodiment, when the reader/writer 20 receives noise during system startup, the system startup is suspended. An error message saying that system startup is suspended is displayed on an output (display) unit 30 of the host computer 1. Whether the reader/writer 20 has received reception data sent from the noncontact IC card 4 or noise is determined as follows: when no command has been sent to the noncontact IC card 4, if the reader/writer 20 receives some signal, the signal is noise. At the time of system startup or at the completion of handshaking, when some signal is sent from the host computer 1 to the reader/writer 20, the signal is recognized as noise. The system startup is then suspended. The software implemented in the reader/writer 20 in this embodiment may be identical to that in the first embodiment.

Thirteenth Embodiment

A system is configured by combining the aforesaid embodiment 1 or 5 with the embodiments 2 to 4 or the embodiments 6 to 10. This results in a more efficient and reliable system.

As described so far, according to the first and seventh aspect of the present invention, a control means incorporated in a reader/writer has neither a command destined for a noncontact IC card nor the ability to process a result of transmission or reception, but merely transfers signals between an external host computer and a noncontact IC card. The reader/writer incurs only a lightened load. Even when an application program running in the noncontact IC card or host computer is altered, the software implemented in the reader/writer need not be modified. The actions of the reader/writer are so simple that programs for the external host computer can be designed easily. This result in an inexpensive system.

According to the second aspect of the present invention, when a baud rate agreed between an external host computer and a reader/writer is different from the one agreed between the reader/writer and a noncontact IC card, signals transferred between the external host computer and noncontact IC card are stored temporarily for future communication. Data can be transmitted irrespective of a baud rate difference.

According to the third aspect of the present invention, a reader/writer fetches a signal sent from an external host computer, and transmits the signal repetitively to a noncontact IC card until a response is returned from the noncontact IC card. The load to the external host computer can be lightened, and fast communication can be achieved efficiently.

According to the fourth aspect of the present invention, for formatting or re-formatting a noncontact IC card, a command is uninterruptedly transmitted to the noncontact IC card at a plurality of baud rates. Subsequent jobs are processed at a baud rate to which the noncontact IC card responds. An operator need therefore not be conscious of whether the noncontact IC card is to be formatted or re-formatted. Operator's work is reduced, and a noncontact IC card can be formatted or re-formatted quickly.

According to the fifth aspect of the present invention, it can be prevented that external noise is mistaken for a signal sent from a noncontact IC card and then received.

According to the sixth aspect of the present invention, a reader/writer includes a start flag setting means for setting a start flag that is a leading code of an electromagnetic-wave signal to an inherent value. Even when a plurality of reader/writers are employed, a reader/writer from which an electromagnetic-wave signal originates can be distinguished easily by checking a value of a start flag. A reader/writer that is now transmitting a signal can be identified on the basis of a start flag. The timing of transmissions made by the reader/writers can be controlled.

According to the eighth aspect of the present invention, even when receiving a Change command from an external host computer via a reader/writer, a noncontact IC card does not actually change setting until it returns a result of executing the Change command to the reader/writer and receives an End command. When the reader/writer receives the result of executing the Change command, occurrence of a reception error attributable to the fact that the setting of a reader/writer has not been changed in time for the reception of the result can be prevented.

According to the ninth aspect of the present invention, when the baud rate agreed between an external host computer and a reader/writer is very high, the reader/writer transmits signals sent from the external host computer sequentially to a noncontact IC card after temporarily storing them, and transmits signals sent from the noncontact IC card directly to the host computer without storing them. Even if the baud rate adopted by an external host computer is very high, programs running in the host computer need not be modified. Communication can still be achieved.

According to the tenth aspect of the present invention, an incorrect reception prevention means is included to set a start flag for use in transmitting an electromagnetic-wave signal from a reader/writer and a start flag for use in transmitting an electromagnetic-wave signal from a noncontact IC card to mutually different codes. Even when a plurality of reader/writers are arranged adjacently, a reader/writer will not receive an electromagnetic-wave signal sent from other reader/writer as a signal sent from the noncontact IC card by mistake.

What is claimed is:

1. A reader/writer for communicating with and providing communication between an external host computer and a noncontact IC card comprising:

input/output means electrically connected to an external host computer for inputting and outputting bidirectional signals to and from the external host computer;

control means electrically connected to said input/output means for controlling transmission of signals between the external host computer and a noncontact. IC card;

electromagnetic wave transmitter/receiver means electrically connected to said control means for transmitting to and receiving from the noncontact IC card bidirectional electromagnetic-wave signals, said control means determining whether a signal has been received from the external host computer through said input/output means and, if a signal has been received from the external host computer, determining whether the signal is a command or data and, if the signal is a command, executing the command and, if the signal is data, transferring the data to the noncontact IC card through said electromagnetic wave transmitter/receiver means and, if no signal has been received from the host computer, determining whether a signal has been received from the noncontact IC card through said electromagnetic wave transmitter/receiver means and, if a signal has been received from the noncontact IC card, transmitting the signal to the external host computer through said input/output means: and means for communicating with the noncontact IC card at a first baud rate and for communicating with the external host computer at a second baud rate, the second baud rate being different from the first baud rate.

2. The reader/writer according to claim 1 comprising buffer means for temporarily storing signals to be transferred between the external host computer and the noncontact IC card.

3. The reader/writer according to claim 1 comprising repetitive transmission means for storing a signal from the external host computer and transmitting the signal repetitively to the noncontact IC card until a response is returned from the noncontact IC card.

4. The reader/writer according to claim 1 comprising formatting means for transmitting a formatting command at each of a plurality of baud rates until a response is returned from the noncontact IC card and determining a first baud rate at which the noncontact IC card responds and subsequently communicating with the noncontact IC card at the first baud rate.

5. The reader/writer according to claim 1 comprising external noise incorrect reception prevention means for preventing mistaken reception of noise as an electromagnetic-wave signal sent from the noncontact IC card.

6. The reader/writer according to claim 1 comprising start flag setting means for setting a leading code of an electromagnetic-wave signal to an inherent value to indicate that the electromagnetic-wave signal is being transmitted from a particular reader/writer.

7. A noncontact IC card system comprising:

an external host computer;

a noncontact IC card; and a reader/writer including:

input/output means electrically connected to said external host computer for inputting and outputting bidirectional signals from and to said external host computer;

control means electrically connected to said input/output means for controlling transmission of signals between said external host computer and said noncontact IC card;

electromagnetic wave transmitter/receiver means electrically connected to said control means for transmitting to and receiving from said the noncontact IC card bidirectional electromagnetic-wave signals, said control means determining whether a signal has been received from said external host computer through said input/output means and, if a signal has been received from said external host computer, determining whether the signal is a command or data and, if the signal is a command, executing the command and, if the signal is data, transferring the data to said noncontact IC card through said electromagnetic wave transmitter/receiver means and, if no signal has been received, determining whether a signal has been received from said noncontact IC card through said electromagnetic wave transmitter/ receiver means and, if a signal has been received from said noncontact IC card, transmitting the signal to said external host computer through said input/ output means; and means for communicating with the noncontact IC card at a first baud rate and for communicating with the external host computer at a second baud rate, the second baud rate being different from the first baud rate.

8. A noncontact IC card system according to claim 7 wherein:

said host computer includes command output means for outputting a Change command for changing a setting of said noncontact IC card and an End command for placing said noncontact IC card into sleep a mode card through said reader/writer; and said noncontact IC card includes setting change means for returning a result of executing the Change command to said reader/writer at a setting prior to changing, and changing the setting of said noncontact IC card according to the Change command after receiving the End command.

9. The noncontact IC card system according to claim 7 wherein said reader/writer includes buffer means for temporarily storing signals transmitted from said external host computer at a high transfer rate, and wherein said reader/ writer transmits signals sent from said external host computer to said noncontact IC card after temporarily storing them in said buffer means, and transmits signals sent from said noncontact IC card directly to said external host computer without storing them.

10. A noncontact IC card system according to claim 7 comprising incorrect reception prevention means for preventing incorrect reception by setting a leading code of an electromagnetic-wave signal sent from said reader/writer and a leading code of an electromagnetic-wave signal sent from said noncontact IC card to mutually different values.

11. The reader/writer according to claim 5 wherein said external noise incorrect reception prevention means comprises a digital code transmitted by the noncontact IC card to said reader/writer.

* * * * *